(12) United States Patent
Kas et al.

(10) Patent No.: US 11,154,821 B2
(45) Date of Patent: Oct. 26, 2021

(54) NANOFIBER CONTAINING COMPOSITE MEMBRANE STRUCTURES

(75) Inventors: Onur Y. Kas, Boston, MA (US);
Mikhail Kozlov, Belmont, MA (US);
Gabriel Tkacik, Bedford, MA (US);
David Nhiem, Lowell, MA (US);
Philip Goddard, Merrimack, NH (US);
Sherry A. Leon, Leominister, MA (US)

(73) Assignee: EMD Millipore Corporation, Burlington, MA (US)

(*) Notice: Subject to any disclaimer, the term of this patent is extended or adjusted under 35 U.S.C. 154(b) by 0 days.

(21) Appl. No.: 13/436,043

(22) Filed: Mar. 30, 2012

(65) Prior Publication Data
US 2013/0092622 A1 Apr. 18, 2013

Related U.S. Application Data

(60) Provisional application No. 61/470,705, filed on Apr. 1, 2011.

(51) Int. Cl.
*B01D 69/12* (2006.01)
*B01D 71/56* (2006.01)
*D01D 5/00* (2006.01)

(52) U.S. Cl.
CPC ............ *B01D 69/12* (2013.01); *B01D 71/56* (2013.01); *D01D 5/0084* (2013.01); *B01D 2323/39* (2013.01); *B01D 2325/02* (2013.01)

(58) Field of Classification Search
CPC ................................ B01D 69/10; B01D 69/12
See application file for complete search history.

(56) References Cited

U.S. PATENT DOCUMENTS

| 500,167 A | 6/1893 | Surerus et al. |
| 552,291 A | 12/1895 | Keefer |
| (Continued) | | |

FOREIGN PATENT DOCUMENTS

| CN | 2390670 Y | 8/2000 |
| CN | 1471421 A | 1/2004 |
| (Continued) | | |

OTHER PUBLICATIONS

Mohammadzadehmoghadam et al., Electrospinning: Current Status and Future Trends, in Nano-Size Polymers: Preparation, Properties, Applications 100, 100 (Stoyko Fakirov ed., 2016).*

(Continued)

*Primary Examiner* — Krishnan S Menon
*Assistant Examiner* — Brad Gordon
(74) *Attorney, Agent, or Firm* — EMD Millipore Corporation

(57) ABSTRACT

A composite liquid filtration platform including a composite filtration medium featuring an electrospun polymeric nanofiber layer collected on a porous membrane. When in use, the porous membrane acts as a prefilter used upstream from the polymeric nanofiber layer to remove particles from a liquid stream flowing through the composite filtration structure. The nanofiber layer, positioned downstream from the porous membrane, is used as the retentive layer for critical filtration to provide biosafety assurance, and is responsible for capturing microorganisms like bacteria, mycoplasma or viruses. The composite liquid filtration platform provided herein exhibits permeability advantages over conventional porous membranes or nanofiber mats spun on coarse nonwovens.

27 Claims, 8 Drawing Sheets

(56) References Cited

U.S. PATENT DOCUMENTS

| | | | |
|---|---|---|---|
| 692,631 A | 2/1902 | Cooley | |
| 705,691 A | 7/1902 | Morton | |
| 1,699,615 A | 1/1929 | Hagiwara | |
| 1,975,504 A | 10/1934 | Formhals | |
| 1,975,594 A | 10/1934 | Stroud et al. | |
| 2,048,651 A | 7/1936 | Norton | |
| 2,158,415 A | 5/1939 | Anton | |
| 2,158,416 A | 5/1939 | Formhals | |
| 2,160,962 A | 6/1939 | Formhals | |
| 2,168,027 A | 8/1939 | Gladding | |
| 2,349,950 A | 5/1944 | Formhals | |
| 3,463,847 A * | 8/1969 | Ueda | D01F 8/12 264/168 |
| 3,585,126 A | 6/1971 | Cannon et al. | |
| 3,620,970 A | 11/1971 | Klug et al. | |
| 3,729,449 A * | 4/1973 | Kimura | C08G 69/40 528/336 |
| 3,864,289 A | 2/1975 | Rendall | |
| 3,876,738 A | 4/1975 | Marinaccio et al. | |
| 3,994,258 A | 11/1976 | Simm | |
| 4,043,331 A | 8/1977 | Martin et al. | |
| 4,069,026 A | 1/1978 | Simm et al. | |
| 4,127,706 A | 11/1978 | Martin et al. | |
| 4,143,196 A | 3/1979 | Simm et al. | |
| 4,261,834 A | 4/1981 | deWinter | |
| 4,323,525 A | 4/1982 | Bornat | |
| 4,510,047 A | 4/1985 | Thompson | |
| 4,604,326 A | 8/1986 | Manabe et al. | |
| 4,629,563 A | 12/1986 | Wrasidlo | |
| 4,650,506 A | 3/1987 | Barris et al. | |
| 4,657,793 A | 4/1987 | Fisher | |
| 4,704,324 A | 11/1987 | Davis et al. | |
| 4,717,498 A | 1/1988 | Maxon | |
| 4,778,601 A | 10/1988 | Lopatin et al. | |
| 4,824,568 A * | 4/1989 | Allegrezza, Jr. | B01D 69/12 210/490 |
| 4,839,203 A | 6/1989 | Davis et al. | |
| 4,849,127 A | 7/1989 | Maxon | |
| 4,853,129 A | 8/1989 | Wan | |
| 4,938,869 A | 7/1990 | Bayerlein et al. | |
| 4,983,268 A | 1/1991 | Kirkpatrick et al. | |
| 4,983,288 A * | 1/1991 | Karbachsch | B01D 69/12 210/321.87 |
| 5,096,473 A | 3/1992 | Sassa et al. | |
| 5,228,994 A * | 7/1993 | Tkacik | B01D 69/12 210/500.29 |
| 5,238,106 A | 8/1993 | Nguyen et al. | |
| 5,238,568 A | 8/1993 | Fely et al. | |
| 5,248,424 A | 9/1993 | Cote et al. | |
| 5,264,165 A | 11/1993 | Knight | |
| 5,283,106 A | 2/1994 | Seiler et al. | |
| 5,435,957 A | 7/1995 | Degen et al. | |
| 5,500,167 A * | 3/1996 | Degen | 264/41 |
| 5,507,847 A | 4/1996 | George et al. | |
| 5,522,601 A | 6/1996 | Murphy | |
| 5,522,991 A | 6/1996 | Tuccelli et al. | |
| 5,536,413 A | 7/1996 | Bormann et al. | |
| 5,620,790 A * | 4/1997 | Holzki | B01D 67/0011 210/500.27 |
| 5,652,050 A | 7/1997 | Pall et al. | |
| 5,693,231 A | 12/1997 | Johnson et al. | |
| 5,731,164 A | 3/1998 | Becker et al. | |
| 5,739,316 A | 4/1998 | Beer et al. | |
| 5,846,438 A | 12/1998 | Pall et al. | |
| 5,968,650 A | 10/1999 | Tennent et al. | |
| 5,985,112 A | 11/1999 | Fischer | |
| 6,045,899 A | 4/2000 | Wang et al. | |
| 6,074,869 A | 6/2000 | Pall et al. | |
| 6,113,794 A | 9/2000 | Kumar et al. | |
| 6,143,675 A | 11/2000 | McCollam et al. | |
| 6,153,098 A | 11/2000 | Bayerlein et al. | |
| 6,171,684 B1 | 1/2001 | Kahlbaugh et al. | |
| 6,315,805 B1 | 11/2001 | Strauss | |
| 6,321,915 B1 | 11/2001 | Wilson et al. | |
| 6,464,881 B2 | 10/2002 | Thoraval | |
| 6,513,666 B2 | 2/2003 | Meyering et al. | |
| 6,554,881 B1 | 4/2003 | Healey | |
| 6,598,749 B2 | 7/2003 | Paul et al. | |
| 6,604,925 B1 | 8/2003 | Dubson | |
| 6,713,011 B2 | 3/2004 | Chu et al. | |
| 6,743,273 B2 | 6/2004 | Chung et al. | |
| 6,746,517 B2 | 6/2004 | Benson et al. | |
| 6,770,204 B1 | 8/2004 | Koslow | |
| 6,796,169 B2 | 9/2004 | Makino et al. | |
| 6,797,169 B1 | 9/2004 | Ide et al. | |
| 6,835,311 B2 | 12/2004 | Koslow | |
| 6,858,057 B2 | 2/2005 | Healey | |
| 6,866,704 B2 | 3/2005 | Koslow | |
| 6,866,794 B1 | 3/2005 | Zhang et al. | |
| 6,872,311 B2 | 3/2005 | Koslow | |
| 6,913,154 B2 | 7/2005 | Koslow | |
| 6,924,028 B2 | 8/2005 | Chung et al. | |
| 6,953,604 B2 | 10/2005 | Koslow | |
| 6,955,775 B2 | 10/2005 | Chung et al. | |
| 6,959,820 B2 | 11/2005 | Koslow | |
| 6,974,490 B2 | 12/2005 | Gillingham et al. | |
| 6,994,811 B2 * | 2/2006 | Kools | B01D 67/0009 210/500.23 |
| 6,998,058 B2 | 2/2006 | Koslow | |
| 7,008,465 B2 | 3/2006 | Graham et al. | |
| 7,008,537 B2 | 3/2006 | Koslow | |
| 7,070,640 B2 | 7/2006 | Chung et al. | |
| 7,070,836 B2 | 7/2006 | Czado | |
| 7,090,712 B2 | 8/2006 | Gillingham et al. | |
| 7,090,715 B2 | 8/2006 | Chung et al. | |
| 7,097,694 B1 | 8/2006 | Jaroszczyk et al. | |
| 7,105,228 B2 | 9/2006 | Averdung et al. | |
| 7,108,791 B2 * | 9/2006 | Tkacik | A61L 2/0017 210/321.75 |
| 7,109,136 B2 | 9/2006 | Senecal et al. | |
| 7,115,150 B2 | 10/2006 | Johnson et al. | |
| 7,144,533 B2 | 12/2006 | Koslow | |
| 7,179,317 B2 | 2/2007 | Chung et al. | |
| 7,229,665 B2 | 6/2007 | Kools | |
| 7,235,122 B2 | 6/2007 | Bryner et al. | |
| 7,270,692 B2 | 9/2007 | Gillingham et al. | |
| 7,270,693 B2 | 9/2007 | Chung et al. | |
| 7,318,853 B2 | 1/2008 | Chung et al. | |
| 7,341,663 B2 | 3/2008 | Offeman et al. | |
| 7,378,020 B2 | 5/2008 | Ieraci et al. | |
| 7,419,601 B2 | 9/2008 | Cooper et al. | |
| 7,459,085 B2 | 12/2008 | Koguma et al. | |
| 7,470,639 B2 | 12/2008 | Angelini et al. | |
| 7,555,195 B2 | 6/2009 | Yamashita et al. | |
| 7,585,437 B2 | 9/2009 | Jirsak et al. | |
| 7,743,929 B2 | 6/2010 | Kools | |
| 7,789,930 B2 | 9/2010 | Ensor et al. | |
| 7,790,135 B2 | 9/2010 | Lennhoff | |
| 7,875,380 B2 | 1/2011 | Chun et al. | |
| 7,927,885 B2 | 4/2011 | Nishita | |
| 7,993,523 B2 | 8/2011 | Chen et al. | |
| 8,002,990 B2 | 8/2011 | Schroeder et al. | |
| 8,038,013 B2 | 10/2011 | Chen et al. | |
| 8,222,166 B2 | 7/2012 | Chu et al. | |
| 8,282,712 B2 | 10/2012 | Chi et al. | |
| 8,361,180 B2 | 1/2013 | Lim et al. | |
| 8,366,797 B2 | 2/2013 | Chung et al. | |
| 8,679,217 B2 | 3/2014 | Chi et al. | |
| 8,689,985 B2 | 4/2014 | Bates, III et al. | |
| 9,174,152 B2 | 11/2015 | Dai et al. | |
| 9,180,393 B2 | 11/2015 | Chen et al. | |
| 9,623,352 B2 | 4/2017 | Kas et al. | |
| 9,750,829 B2 | 9/2017 | Kozlov et al. | |
| 9,889,214 B2 | 2/2018 | Kozlov et al. | |
| 9,943,616 B2 | 4/2018 | Kozlov et al. | |
| 10,064,965 B2 | 9/2018 | Kozlov et al. | |
| 10,252,199 B2 | 4/2019 | Kas et al. | |
| 2002/0046656 A1 | 4/2002 | Benson et al. | |
| 2002/0084178 A1 | 7/2002 | Dubson et al. | |
| 2002/0096246 A1 | 7/2002 | Sennet et al. | |
| 2002/0100725 A1 | 8/2002 | Lee et al. | |
| 2002/0117439 A1 | 8/2002 | Paul et al. | |
| 2002/0124953 A1 | 9/2002 | Sennett et al. | |

(56) References Cited

U.S. PATENT DOCUMENTS

| | | |
|---|---|---|
| 2002/0175124 A1 | 11/2002 | Tkacik et al. |
| 2003/0010002 A1 | 1/2003 | Johnson et al. |
| 2003/0026985 A1 | 2/2003 | Greiner et al. |
| 2003/0106294 A1 | 6/2003 | Chung et al. |
| 2003/0121844 A1 | 7/2003 | Koo et al. |
| 2003/0137083 A1 | 7/2003 | Ko et al. |
| 2003/0177909 A1 | 9/2003 | Koslow |
| 2003/0213218 A1 | 11/2003 | Dubson |
| 2003/0213744 A1* | 11/2003 | Kools ............... B01D 69/12 210/500.21 |
| 2004/0017011 A1 | 1/2004 | Narita et al. |
| 2004/0036014 A1 | 2/2004 | Simon |
| 2004/0038013 A1 | 2/2004 | Schaefer et al. |
| 2004/0038014 A1 | 2/2004 | Schaefer et al. |
| 2004/0070118 A1 | 4/2004 | Czado |
| 2004/0080083 A1 | 4/2004 | Czado |
| 2004/0116025 A1 | 6/2004 | Gogins et al. |
| 2004/0118770 A1 | 6/2004 | Sale et al. |
| 2004/0159609 A1 | 8/2004 | Chase |
| 2004/0206693 A1 | 10/2004 | Charkoudian et al. |
| 2004/0206694 A1 | 10/2004 | Charkoudian |
| 2004/0207126 A1 | 10/2004 | Czado |
| 2004/0255783 A1 | 12/2004 | Graham et al. |
| 2005/0008707 A1 | 1/2005 | Hovey et al. |
| 2005/0026526 A1 | 2/2005 | Verdegan et al. |
| 2005/0048274 A1 | 3/2005 | Rabolt et al. |
| 2005/0051487 A1 | 3/2005 | Koslow |
| 2005/0053782 A1 | 3/2005 | Sen et al. |
| 2005/0067732 A1 | 3/2005 | Kim et al. |
| 2005/0073075 A1 | 4/2005 | Chu et al. |
| 2005/0142973 A1 | 6/2005 | Bletsos et al. |
| 2005/0163955 A1 | 7/2005 | Schaefer et al. |
| 2005/0210844 A1 | 9/2005 | Kahlbaugh et al. |
| 2005/0235619 A1 | 10/2005 | Heinz et al. |
| 2005/0247236 A1 | 11/2005 | Frey et al. |
| 2005/0260381 A1* | 11/2005 | Ditter ............... B01D 71/34 428/131 |
| 2005/0272925 A1 | 12/2005 | Charkoudian et al. |
| 2006/0016748 A1 | 1/2006 | Koguma et al. |
| 2006/0053782 A1 | 3/2006 | Kobayashi et al. |
| 2006/0057377 A1 | 3/2006 | Harrison et al. |
| 2006/0060519 A1* | 3/2006 | Tkacik ............... B01D 69/02 210/321.86 |
| 2006/0068668 A1 | 3/2006 | Kameoka et al. |
| 2006/0084340 A1 | 4/2006 | Bond et al. |
| 2006/0084341 A1 | 4/2006 | Bodaghi et al. |
| 2006/0086657 A1 | 4/2006 | Kools |
| 2006/0094320 A1 | 5/2006 | Chen et al. |
| 2006/0096912 A1 | 5/2006 | Nussbaumer et al. |
| 2006/0097431 A1 | 5/2006 | Hovanec |
| 2006/0135020 A1 | 6/2006 | Weinberg et al. |
| 2006/0137317 A1 | 6/2006 | Bryner et al. |
| 2006/0137318 A1 | 6/2006 | Lim et al. |
| 2006/0138710 A1 | 6/2006 | Bryner et al. |
| 2006/0138711 A1 | 6/2006 | Bryner et al. |
| 2006/0144782 A1 | 7/2006 | Buck |
| 2006/0149561 A1 | 7/2006 | Govender |
| 2006/0151094 A1* | 7/2006 | Angelini ............... B01D 69/10 156/176 |
| 2006/0160064 A1 | 7/2006 | Carbonell |
| 2006/0213829 A1 | 9/2006 | Rutledge et al. |
| 2006/0230731 A1 | 10/2006 | Kalayci et al. |
| 2006/0246798 A1 | 11/2006 | Reneker et al. |
| 2006/0264139 A1 | 11/2006 | Czado |
| 2006/0264140 A1 | 11/2006 | Andrady et al. |
| 2006/0286446 A1 | 12/2006 | Chun et al. |
| 2006/0286886 A1 | 12/2006 | Komura et al. |
| 2006/0290031 A1 | 12/2006 | Jirsak et al. |
| 2006/0293116 A1 | 12/2006 | Hocknell et al. |
| 2006/0293169 A1 | 12/2006 | Srinivasan et al. |
| 2007/0009736 A1 | 1/2007 | Chuang et al. |
| 2007/0018361 A1 | 1/2007 | Xu |
| 2007/0021021 A1 | 1/2007 | Verdegan et al. |
| 2007/0040305 A1 | 2/2007 | Armantrout et al. |
| 2007/0042069 A1 | 2/2007 | Armantrout |
| 2007/0062855 A1 | 3/2007 | Chase et al. |
| 2007/0074628 A1 | 4/2007 | Jones et al. |
| 2007/0075015 A1* | 4/2007 | Bates, III ............ D04H 1/5405 210/505 |
| 2007/0084786 A1 | 4/2007 | Smithies |
| 2007/0113530 A1 | 5/2007 | Morozov et al. |
| 2007/0125700 A1 | 6/2007 | Ding et al. |
| 2007/0134151 A1 | 6/2007 | Jo et al. |
| 2007/0151921 A1 | 7/2007 | Nakano et al. |
| 2007/0163217 A1 | 7/2007 | Frey et al. |
| 2007/0175196 A1 | 8/2007 | Tepper et al. |
| 2007/0196401 A1 | 8/2007 | Naruse et al. |
| 2007/0240576 A1 | 10/2007 | von Blucher et al. |
| 2007/0298072 A1 | 12/2007 | Kitazono et al. |
| 2008/0004205 A1* | 1/2008 | Tkacik ............... B01D 61/145 210/500.21 |
| 2008/0004206 A1 | 1/2008 | Rosen et al. |
| 2008/0010959 A1 | 1/2008 | Gillingham et al. |
| 2008/0020192 A1 | 1/2008 | Yen et al. |
| 2008/0022024 A1 | 1/2008 | Mao |
| 2008/0026041 A1 | 1/2008 | Tepper et al. |
| 2008/0034967 A1 | 2/2008 | Ping |
| 2008/0060328 A1 | 3/2008 | Devine |
| 2008/0070463 A1 | 3/2008 | Arora et al. |
| 2008/0073296 A1 | 3/2008 | Dema et al. |
| 2008/0099398 A1 | 5/2008 | Hu et al. |
| 2008/0110342 A1* | 5/2008 | Ensor ............... D01D 5/0076 96/54 |
| 2008/0110822 A1 | 5/2008 | Chung et al. |
| 2008/0134652 A1 | 6/2008 | Lim et al. |
| 2008/0136063 A1 | 6/2008 | Chuang et al. |
| 2008/0149561 A1* | 6/2008 | Chu ............... B01D 69/10 210/500.38 |
| 2008/0150192 A1 | 6/2008 | Perret et al. |
| 2008/0150197 A1 | 6/2008 | Chang et al. |
| 2008/0164214 A1 | 7/2008 | Lerner et al. |
| 2008/0207076 A1 | 8/2008 | Jirsak et al. |
| 2008/0213574 A1 | 9/2008 | McKee et al. |
| 2008/0217239 A1 | 9/2008 | Chen et al. |
| 2008/0217241 A1 | 9/2008 | Smithies et al. |
| 2008/0217807 A1 | 9/2008 | Lee et al. |
| 2008/0220241 A1 | 9/2008 | Abdelsalam et al. |
| 2008/0237934 A1 | 10/2008 | Reneker et al. |
| 2008/0242171 A1 | 10/2008 | Huang et al. |
| 2008/0264258 A1 | 10/2008 | Mares et al. |
| 2008/0264259 A1 | 10/2008 | Leung |
| 2008/0274312 A1 | 11/2008 | Schelling et al. |
| 2008/0284050 A1 | 11/2008 | Mares et al. |
| 2008/0302074 A1 | 12/2008 | Gebert et al. |
| 2009/0026137 A1 | 1/2009 | Chen et al. |
| 2009/0065436 A1* | 3/2009 | Kalayci ............... B01D 46/0036 210/679 |
| 2009/0110873 A1 | 4/2009 | Jiang et al. |
| 2009/0199717 A1 | 8/2009 | Green et al. |
| 2009/0220241 A1 | 9/2009 | Katagiri et al. |
| 2010/0096066 A1 | 4/2010 | Ramaswamy et al. |
| 2010/0139224 A1 | 6/2010 | Lim et al. |
| 2010/0173070 A1 | 7/2010 | Niu |
| 2010/0193428 A1 | 8/2010 | Hane et al. |
| 2010/0206803 A1 | 8/2010 | Ward et al. |
| 2010/0316988 A1 | 12/2010 | Sehgal |
| 2011/0163035 A1 | 7/2011 | Cheng et al. |
| 2011/0198282 A1 | 8/2011 | Chu et al. |
| 2011/0206973 A1 | 8/2011 | Brant et al. |
| 2011/0233152 A1 | 9/2011 | Wieczorek et al. |
| 2011/0240550 A1 | 10/2011 | Moore et al. |
| 2011/0266213 A1 | 11/2011 | Jo et al. |
| 2011/0305872 A1 | 12/2011 | Li et al. |
| 2012/0061314 A1 | 3/2012 | Choi et al. |
| 2012/0061332 A1* | 3/2012 | Kas ............... A61L 2/022 210/767 |
| 2012/0091072 A1* | 4/2012 | Kozlov ............... A61L 2/0017 210/767 |
| 2012/0125847 A1 | 5/2012 | Sehgal |
| 2012/0125866 A1 | 5/2012 | Fantini |
| 2012/0296291 A1* | 11/2012 | Painchaud ............ B05B 11/00444 604/298 |
| 2012/0318752 A1 | 12/2012 | Velu et al. |

(56) References Cited

U.S. PATENT DOCUMENTS

| | | |
|---|---|---|
| 2013/0092622 A1 | 4/2013 | Kas et al. |
| 2014/0061114 A1 | 3/2014 | Ramirez |
| 2014/0116945 A1 | 5/2014 | Kas et al. |
| 2015/0037055 A1 | 2/2015 | Kitagawa et al. |
| 2015/0136693 A1 | 5/2015 | Hwang et al. |
| 2015/0298070 A1 | 10/2015 | Koslov et al. |
| 2015/0360157 A1 | 12/2015 | Hwang et al. |
| 2016/0016124 A1 | 1/2016 | Zheng et al. |
| 2016/0113340 A1 | 4/2016 | Levit et al. |
| 2016/0136558 A1 | 5/2016 | Zheng et al. |
| 2016/0136584 A1 | 5/2016 | Hwang et al. |
| 2016/0166961 A1 | 6/2016 | Haberkamp et al. |
| 2016/0175748 A1 | 6/2016 | Park |
| 2016/0193555 A1 | 7/2016 | Park |
| 2017/0173509 A1 | 6/2017 | Giglia et al. |
| 2017/0173511 A1 | 6/2017 | Kas et al. |
| 2017/0360969 A1 | 12/2017 | Kozlov et al. |

FOREIGN PATENT DOCUMENTS

| | | | |
|---|---|---|---|
| CN | 1625429 A | | 6/2005 |
| CN | 1942616 A | | 4/2007 |
| CN | 101272840 A | | 9/2008 |
| CN | 101318090 A | | 12/2008 |
| CN | 101564656 A | | 10/2009 |
| CN | 102227247 A | | 10/2011 |
| CN | 102448508 A | | 5/2012 |
| CN | 102917777 A | | 2/2013 |
| CN | 104321133 A | | 1/2015 |
| CN | 106457079 A | | 2/2017 |
| CN | 103972452 B | | 3/2017 |
| DE | 19545701 C1 | | 5/1997 |
| EP | 0168783 A1 | | 1/1986 |
| EP | 0257635 A2 | | 3/1988 |
| EP | 0320033 A1 | | 6/1989 |
| EP | 0497594 A1 | | 8/1992 |
| EP | 0781600 A2 | | 7/1997 |
| EP | 1743975 A1 | | 1/2007 |
| EP | 1745808 A1 | | 1/2007 |
| EP | 1829603 A1 | | 9/2007 |
| EP | 1878482 A1 | | 1/2008 |
| EP | 1673493 B1 | | 7/2009 |
| EP | 2174703 A1 | | 4/2010 |
| EP | 2222385 B1 | | 9/2010 |
| EP | 2599908 A1 | | 6/2013 |
| GB | 1519070 A | | 7/1978 |
| JP | S62-181797 A | | 8/1987 |
| JP | 2-161954 A | | 6/1990 |
| JP | 4-351645 A | | 12/1992 |
| JP | 2000-61277 A | | 2/2000 |
| JP | 200061277 A | | 2/2000 |
| JP | 2000-325764 A | | 11/2000 |
| JP | 2004-028875 A | | 1/2004 |
| JP | 2004351645 A | | 12/2004 |
| JP | 2005-065647 A | | 3/2005 |
| JP | 2005-515880 A | | 6/2005 |
| JP | 2005-270965 A | | 10/2005 |
| JP | 2005-333886 A | | 12/2005 |
| JP | 2005-536347 A | | 12/2005 |
| JP | 200682006 A | | 3/2006 |
| JP | 2006-326579 A | | 12/2006 |
| JP | 2006341233 A | * | 12/2006 |
| JP | 2007075739 A | | 3/2007 |
| JP | 2007105724 A | | 4/2007 |
| JP | 2007213876 A | | 8/2007 |
| JP | 2007301436 A | | 11/2007 |
| JP | 2007-332342 A | | 12/2007 |
| JP | 2007332342 A | | 12/2007 |
| JP | 200849239 A | | 3/2008 |
| JP | 2008-162098 A | | 7/2008 |
| JP | 2009-006272 A | | 1/2009 |
| JP | 2009-509754 A | | 3/2009 |
| JP | 200950851 A | | 3/2009 |
| JP | 2009-148748 A | | 7/2009 |
| JP | 2009148746 A | | 7/2009 |
| JP | 2009183879 A | | 8/2009 |
| JP | 2009233550 A | | 10/2009 |
| JP | 2010-000407 A | | 1/2010 |
| JP | 2010-94962 A | | 4/2010 |
| JP | 2011/529778 A | | 12/2011 |
| JP | 2012-520761 A | | 9/2012 |
| JP | 2012-189355 A | | 10/2012 |
| JP | 2012-523320 A | | 10/2012 |
| JP | 2013-236985 A | | 11/2013 |
| JP | 2014-504951 A | | 2/2014 |
| JP | 2014-514958 A | | 6/2014 |
| JP | 2014208342 | | 11/2014 |
| JP | 2015-045114 A | | 3/2015 |
| JP | 2017-506339 A | | 3/2017 |
| KR | 2002-0012674 A | | 2/2002 |
| KR | 2005-0037906 A | | 4/2005 |
| KR | 10-2005-0077304 A | | 8/2005 |
| KR | 10-2006-0079211 A | | 7/2006 |
| KR | 10-0871440 B1 | | 12/2008 |
| KR | 10-2010-0023152 A | | 3/2010 |
| KR | 10-2010-0037055 A | | 4/2010 |
| WO | 97/20622 A1 | | 6/1997 |
| WO | 97/42835 A1 | | 11/1997 |
| WO | WO-1999/016810 A1 | | 4/1999 |
| WO | 00/05358 A | | 2/2000 |
| WO | WO-200045933 A1 | | 8/2000 |
| WO | WO-2000/056804 A1 | | 9/2000 |
| WO | WO-2000/058388 A1 | | 10/2000 |
| WO | WO-200101047 A1 | | 1/2001 |
| WO | 01/07599 A | | 2/2001 |
| WO | 01/14047 A1 | | 3/2001 |
| WO | 03/016601 A1 | | 2/2003 |
| WO | WO-2003/037959 A1 | | 5/2003 |
| WO | 2003/064013 A1 | | 8/2003 |
| WO | WO-03/064013 A1 | | 8/2003 |
| WO | 2003/080905 A1 | | 10/2003 |
| WO | 2004/018079 A2 | | 3/2004 |
| WO | 2005-024101 A1 | | 3/2005 |
| WO | WO-2005/073441 A1 | | 8/2005 |
| WO | WO-2006/016800 A1 | | 2/2006 |
| WO | 2006/068100 A1 | | 6/2006 |
| WO | 2006/131081 A1 | | 12/2006 |
| WO | WO-2006/131061 A1 | | 12/2006 |
| WO | 2007/001405 A2 | | 1/2007 |
| WO | WO-2007/11477 A2 | | 1/2007 |
| WO | 2007/041311 A2 | | 4/2007 |
| WO | 2007/054039 A1 | | 5/2007 |
| WO | 2007/054040 A1 | | 5/2007 |
| WO | WO-2007/054050 A1 | | 5/2007 |
| WO | 2007/054040 A3 | | 8/2007 |
| WO | WO-2007/098889 A1 | | 9/2007 |
| WO | 2007/111477 A1 | | 10/2007 |
| WO | 2007/137530 A2 | | 12/2007 |
| WO | WO-2007/144189 A2 | | 12/2007 |
| WO | 2008/034190 A1 | | 3/2008 |
| WO | 2008/073507 A2 | | 6/2008 |
| WO | 2008/106803 A1 | | 9/2008 |
| WO | 2008/106903 A2 | | 9/2008 |
| WO | 2008/109117 A1 | | 9/2008 |
| WO | WO-2008/106903 A2 | | 9/2008 |
| WO | WO-2008/142023 A2 | | 11/2008 |
| WO | 2009/010020 A2 | | 1/2009 |
| WO | 2009/017086 A1 | | 2/2009 |
| WO | 2009/032040 A1 | | 3/2009 |
| WO | 2009/064757 A1 | | 5/2009 |
| WO | 2009/064767 A | | 5/2009 |
| WO | WO-2009/063067 A1 | | 5/2009 |
| WO | WO-2009/064767 A2 | | 5/2009 |
| WO | 2009/071909 A1 | | 6/2009 |
| WO | WO-2009/119638 A1 | | 10/2009 |
| WO | 2010-042647 A2 | | 4/2010 |
| WO | WO-2010/042706 A1 | | 4/2010 |
| WO | WO-2010/049535 A1 | | 5/2010 |
| WO | 2010/069296 A1 | | 6/2010 |
| WO | 2010/107503 A1 | | 9/2010 |
| WO | 2010/120668 A1 | | 10/2010 |
| WO | WO-2010/127634 A1 | | 11/2010 |
| WO | 2010/147763 A2 | | 12/2010 |
| WO | 2011/019686 A1 | | 2/2011 |

(56) References Cited

FOREIGN PATENT DOCUMENTS

| WO | 2011/151314 A1 | 12/2011 |
|---|---|---|
| WO | 2012/021308 A2 | 2/2012 |
| WO | WO-2012/021208 A2 | 2/2012 |
| WO | 2012/088205 A1 | 6/2012 |
| WO | 2012/135679 A2 | 10/2012 |
| WO | 2012/135679 A9 | 1/2013 |
| WO | 2013/013241 A2 | 1/2013 |
| WO | 2014/093345 A1 | 6/2014 |
| WO | 2014/159124 A1 | 10/2014 |
| WO | 2015/091181 A2 | 6/2015 |
| WO | 2015/123154 A1 | 8/2015 |
| WO | WO-2015200239 A1 | 12/2015 |
| WO | 2016/194707 A1 | 12/2016 |

OTHER PUBLICATIONS

Aussawasathien et al., Separation of micron to sub-micron particles from water: Electrospun nylon-6 nanofibrous membranes as pre-filters, 315 J. Membrane Sci. 11, 11-19 (2008). (Year: 2008).*
International Preliminary Report on Patentability received for PCT Patent Application No. PCT/US2011/045905, dated Feb. 21, 2013, 7 pages.
International Search Report and Written Opinion recieved for PCT Patent Application No. PCT/US2012/047665, dated Feb. 28, 2013, 18 pages.
International Search Report and Written Opinion received for PCT patent Application No. PCT/US2011/0045905, dated Mar. 19, 2012, 13 pages.
International Search and Written Opinon received for PCT Patent Application No. PCT/US2012/031549, dated Nov. 28, 2012, 15 pages.
Aussawasathien et al., "Separation of Micron to Sub-Micron Particles from Water: Electrospun Nylon-6 Nanofibrous Membranes as Pre-Filters", Journal of Memebranes Science, vol. 315, 2008, pp. 11-19.
Bjorge et al., "Performance Assessment of Electrospun Nanofilbers for Filter Applications", Desaliniation, vol. 249, 2009, 7 pages.
Gopal et al., "Electrospun Nanofibrous Polysulfone Membranes as Pre-Filters Particulate Removal", Journal of Membrane Science, vol. 289, 2007, pp. 210-219.
Meltzer et al., "Filtration and Purification in the Biopharmaceutical Industry", 2nd edition, Informa Healthcare USA Inc., Chapter 20, 2008, pp. 543-577.
International Preliminary Report on Patentability received for PCT Patent Application No. PCT/US012/031549, dated Oct. 10, 2013, 10 pages.
Blanchard, Mark M.,"Quantifying Sterilizing Membrane Retention Assurance", BioProcess International, vol. 5, No. 5, May 2007, 6 pages.
Li et al., "Collecting Electrospun Nanofibers with Patterned Electrodes", Nano Letters, vol. 5, No. 5, 2005, pp. 913-916.
Galka, et al., "Life Sciences: Trends in Biopharmaceutical Filtration and Clarification", Filtration & Separation, vol. 44, No. 3, Apr. 2007, pp. 18-21.
DatabaseWPI, "Week 200935". Thomson Scientific London, GB, 2009-F08014; XP002726900, 2 pages.
International Search Report and Written Opinion dated Aug. 16, 2010 in co-pending PCT application No. PCT/US2010/000826.
International Preliminary Report on Patentability dated Sep. 29, 2011 in co-pending PCT application No. PCT/US2010/000826.
International Preliminary Report on Patentability dated Jan. 30, 2014 in co-pending PCT application No. PCT/US2012/047865.
Japanese communication, with English translation, dated Mar. 18, 2014 in co-pending Japanese patent application No. 2013-524096.
ASTM International, ASTM E1294-89 (1999) Withdrawal Notice, Withdrawn Standard, Standard Test Method for Pore Size Characteristics of Membrane Filters Using Automated Liquid Porosimeter (Withdrawn 2008), p. 1.

ASTM International, Designation: F316-03, 2003, Standard Test Methods for Pore Size Characteristics of Membrane Filters by Bubble Point and Mean Flow Pore Test, pp. 1-7.
ASTM International, Designation: F838-05, 2005, Standard Test Method for Determining Bacterial Retention of Membrane Filters Utilized for Liquid Filtration, pp. 1-6.
Mycoplasma—Recent Developments in Detecting and in Preventing Bioreactor Contamination, 2005, ISPE Annual Meeting, Scottsdale, Arizona, Nov. 6-10, 2005, Slides 1-38, 38 pages, Blackwell.
In Filtration in the Pharmaceutical Industry, Marcel Dekker, NY, 1987, p. 103, Filter Porosity Characteristics, 3.2.2 Narrow Pore-Size Distribution of Inverse-Phase Membranes, Meltzer.
Biopharm, vol. 5 No. 3, Apr. 1992, pp. 22-23, "Methods Used to Validate Microporous Membranes for the Removal of Mycoplasma", Roche, et al.
Journal of Membrane Science, vol. 392-393, 2012, pp. 167-174, "Electrospun nanofibrous membranes for high flux microfiltration", Wang, et al.
Office Action dated Dec. 13, 2013 in co-pending U.S. Appl. No. 13/257,501.
Office Action—Restriction—dated Jul. 31, 2013 in co-pending U.S. Appl. No. 13/194,227.
Office Action dated Oct. 31, 2013 in co-pending U.S. Appl. No. 13/194,227.
Final Rejection dated Aug. 21, 2014 in co-pending U.S. Appl. No. 13/194,227.
Japanese communication, with English translation, dated Apr. 7, 2015 in co-pending Japanese patent application No. 2014-521858.
International Search Report dated Mar. 21, 2014 in co-pending PCT application No. PCT/US2013/074132.
ASTM International, Designation: D1777, Reapproved 2011, "Standard Test Method for Thickness of Textile Materials", 5 pages.
Journal of Membrane Science, 2006, vol. 283, pp. 209-218, "Preparation and characterization of nanofibrous filtering media", Barhate, et al.
Journal of Membrane Science, 2007, vol. 296, pp. 1-8, "Nanofibrous filtering media: Filtration problems and solutions from tiny materials", Barhate, et al.
Advanced Functional Materials, 2008, vol. 18, pp. 2618-2624, DOI: 10.1002/adfm.200701487, "Strong, Tough, Electrospun Polymer-Nanotube Composite Membranes with Extremely Low Density", Blond, et al.
Polymer, 2001, vol. 42, pp. 261-272, "The effect of processing variables on the morphology of electrospun nanofibers and textiles", Deitzel, et al.
Journal of Electrostatics, 1995, vol. 35, pp. 151-160, "Electrospinning Process and Applications of Electrospun Fibers", Doshi, et al.
2008 2nd IEEE International Nanoelectronics Conference (INEC 2008), pp. 33-38, "Preparing Graphitic Nanoribbons from Ultrathin Electrospun Poly(methyl methacrylate) Nanofibers by Electron Beam Irradiation", Duan, et al.
Colloids and Surfaces A: Physicochemical and Engineering Aspects, 2001, vol. 187-188, pp. 469-481, "Transport properties of porous membranes based on electrospun nanofibers", Gibson, et al.
Macromolecules, 2002, vol. 35, pp. 2429-2431, "Poly (p-xylylene) Nanotubes by Coating and Removal of Ultrathin Polymer Template Fibers", Hou, et al.
Nanotechnology, 2006, vol. 17, pp. 1558-1563, "Electrospun polymer nanofibres with small diameters", Huang, et al.
Journal of the the Electrochemical Society, 2005, vol. 152(2), pp. A295-A300, "Characterization and Properties of P (VdF-HFP)-Based Fibrous Polymer Electrolyte Membrane Prepared by Electrospinning", Kim, et al.
Introduction to Modern Virology, 2007, p. 450, Blackwell Publishing Limited, Appendixes: Survey of Virus Properties, Viruses with ssDNA genomes (class 2), 5 pages, Dimmock, et al.
Conference Report from Nanocon 2010, Oct. 2010, "Water Filtration by Nanotextiles", 6 pages, Lev, et al.
J. of Supercritical Fluids, 2004, vol. 31, pp. 329-333, "Supercritical $CO_2$-assisted electrospinning", Levit, et al.
Journal of Applied Polymer Science, 2008, vol. 107, p. 909-917, "Preparation of Poly(ether sulfone) Nanofibers by Gas-Jet/Electrospinning", Lin, et al.

(56) References Cited

OTHER PUBLICATIONS

Polymer News, 2005, vol. 30, No. 6, pp. 1-9, "Melt Electrospinning of Polymers: A Review", Lyons, et al.
Journal of Membrane Science, 2005, vol. 265, pp. 115-123, "Electrospun cellulose nanofiber as affinity membrane", Ma, et al.
Journal of Membrane Science, 2006, vol. 272, pp. 179-187, "Surface modified nonwoven polysulphone (PSU) fiber mesh by electrospinning: A novel affinity membrane", Ma, et al.
Polymer Engineering and Science, 2008, vol. 48, pp. 934-940, Effect of Hot-Press on Electrospun Poly(vinylidene fluoride) Membranes, Na, et al.
Journal of Power Sources, 2008, vol. 184, pp. 437-443, "Novel electrospupn poly(vinylidene fluoride-co-hexafluoropropylene)-in situ SiO2 composite membrane-based polymer electrolyte for lithium batteries", Raghavan, et al.
Advanced Drug Delivery Reviews, 2007, vol. 59, pp. 1384-1391, "Formation of fibers by electrospinning", Rutledge, et al.
Desalination, 2008, vol. 223, pp. 349-360, "Heavy metal-contaminated groundwater treatment by a novel nanofiber membrane", Sang, et al.
Journal of Hazardous Materials, 2008, vol. 153, pp. 860-866, "Filtration by a novel nanofiber membrane and alumina adsorption to remove copper(II) from groundwater", Sang, et al.
Biomaterials, 2008, vol. 29, pp. 1989-2006, "Electrospinning: Applications in drug delivery and tissue engineering", Sill, et al.
Polymer, 2005, vol. 46, pp. 2419-2423, "Continuous yarns from electrospun fibers", Smit, et al.
Polymer, 2005, vol. 46, pp. 6128-6134, "Systematic parameter study for ultra-fine fiber fabrication via electrospinning process", Tan, et al.
Nanotechnology, 2006, vol. 17, R89-R106, "A review on electrospinning design and nanofibre assemblies", Teo, et al.
Polymer, 2004, vol. 45, pp. 2977-2980, "Upward needleless electrospinning of multiple nanofibers", Yarin, et al.
Polymer, 2006, vol. 47, pp. 2434-2441, "High flux ultrafiltration membranes based on electrospun nanofibrous PAN scaffolds and chitosan coating", Yoon, et al.
Biosensors and Bioelectronics, 2008, vol. 23, pp. 1208-1215, "Selective molecular adsorption using electrospun nanofiber affinity membranes", Yoshimatsu, et al.
Chemical Engineering Science, 2007, vol. 62, pp. 4751-4759, "Nanoparticle filtration by electrospun polymer fibers", Yun, et al.
Journal of Applied Polymer Science, 2005, vol. 97, pp. 466-474, "Preparation and Properties of Electrospun Poly (Vinylidene Fluoride) Membranes", Zhao, et al.
Office Action dated Mar. 3, 2015 in co-pending U.S. Appl. No. 13/194,227.
ASTM International, Designation: D1777-64, Reapproved 1975, "Standard Test Method for Thickness of Textile Materials", p. 477-478.
International Preliminary Report on Patentability dated Jun. 25, 2015 in co-pending PCT application No. PCT/US2013/074132.
ASTM International, Designation: F316-03 (Reapproved 2011), Standard Test Methods for Pore Size Characteristics of Membrane Filters by Bubble Point and Mean Flow Pore Test, 2011, 7 pages.
ASTM International, Designation: F838-15, Standard Test Method for Determining Bacterial Retention of Membrane Filters Utilized for Liquid Filtration, 2015, 6 pages.
Extended European Search Report received for EP patent Application No. 07114167.5, dated Nov. 6, 2007, 7 pages.
Extended European Search Report received for EP Patent Application No. 10181774.0, dated Nov. 25, 2010, 5 pages.
Bhanushali et al., "Advances in Solvent-Resistant Nanofiltration Membranes: Experimental Observations and Applications", Annals of the New York Academy of Sciences, vol. 984, Mar. 2003, pp. 159-177.
Ebert et al., "Solvent Resistant Nanofiltration Membranes in Edible Oil Processing", Membrane Technology, vol. 107, 1999, pp. 5-8.

Granath et al., "Molecular Weight Distribution Analysis by Gel Chromatography on Sephadex", Journal of Chromatography A, vol. 28, 1967, pp. 69-81.
Guo et al., "Cellulose Membrane used as Stationary Phase of Membrane Affinity Chromatography", Chinese Chemical Letters, vol. 5, No. 10, 1994, pp. 869-872.
Zeman et al., "Steric Rejection of Polymeric Solutes by Membranes with Uniform Pore Size Distribution", Separation Science and Technology, vol. 16, No. 3, Apr. 1981, pp. 275-290.
Zwijnenberg et al., "Acetone-Stable Nanofiltration Membranes in Deacidifying Vegetable Oil", Journal of the American Oil Chemists' Society, vol. 76, No. 1, 1999, pp. 83-87.
Korean communication, with English translation, dated Mar. 28, 2016 in co-pending Korean patent application No. 10-2013-7031748.
Chinese communication, with English translation, dated Feb. 29, 2016 in co-pending Chinese patent application No. 2013800708733 (P-12/101-China).
International Search Report and Written Opinion dated Sep. 15, 2015 in co-pending PCT application No. PCT/US2015/037055 (P-14-120-PCT).
Office action dated Sep. 30, 2015 in co-pending U.S. Appl. No. 13/257,501.
Final rejection dated Sep. 1, 2015 in co-pending U.S. Appl. No. 13/194,227.
Office action dated Apr. 12, 2016 in co-pending U.S. .Appl. No. 14/118,490.
International Search Report and Written Opinion Received for PCT Application No. PCT/US2016/018146, dated Jun. 7, 2016, 11 pages.
ASTM E1294-89 Withdrawal Notice, 2008, p. 1.
ASTM F316, 2003, pp. 1-7.
ASTM F838-05, "Standard Test Method for Determining Bacterial Retention of Membrane Filters Utilized for Liquid Filtration," 2005, 6 pages.
ASTM F838-83, "Standard Test Method for Determining Bacterial Retention of Membrane Filters Utilized for Liquid Filtration," 2005, 8 pages.
ASTM International, Designation: D1777,"Standard Test Method for Thickness of Textile Materials,"(Reapproved 2015), Sep. 2015, 5 pages.
ATCC 19146 Product Data Sheet, "Brevundimonas diminuta," pp. 1-2.
Bhanushali et al., "Advances in Solvent-Resistant Nanofiltration Membranes: Experimental Observations and Applications," Ann Ny Acad Sci, vol. 984, Mar. 2003, pp. 159-177.
English translation WO 2010/069296 A1 (Jun. 2010).
English translation of Japanese communication, dated Apr. 11, 2016 in co-pending Japanese patent application No. 2014-502850.
European communication dated Jul. 20, 2016 in co-pending European patent application No. 13863417.5.
Aranha, "Ensuring Safety of Biopharmaceuticals: Virus and Prion Safety Considerations", Chapter 20 in "Filtration and Purification in the Biopharmaceutical Industry," eds.Meltzer et al., 2nd edition, Informa Healthcare USA, Inc., pp. 543-577 (2008).
Final rejection dated Oct. 14, 2015 in co-pending U.S. Appl. No. 13/436,043.
Final Rejection dated Apr. 30, 2014 in co-pending U.S. Appl. No. 13/436,043.
Final rejection dated Jul. 11, 2016 in co-pending U.S. Appl. No. 13/257,501.
Final Rejection dated Aug. 7, 2014 in co-pending U.S. Appl. No. 13/257,501.
International Preliminary Report on Patentability dated Oct. 10, 2013 in co-pending PCT application No. PCT/US2012/031549.
International Preliminary Report on Patentability dated Feb. 21, 2013 in co-pending PCT application No. PCT/US2011/045905.
International Preliminary Report on Patentability dated Mar. 19, 2012 in co-pending PCT application No. PCT/US2011/045905.
International Preliminary Report on Patentability received for PCT Application No. PCT/US2010/000826 dated Sep. 26, 2011, 9 pages.

(56) References Cited

OTHER PUBLICATIONS

International Preliminary Report on Patentability received for PCT Patent Application No. PCT/US2011/045805, dated Feb. 21, 2013, 7 pages.
International Search Report and Written Opinion dated Nov. 28, 2012 in co-pending PCT application No. PCT/US2012/031549.
International Search Report and Written Opinion dated Feb. 26, 2013 in co-pending PCT application No. PCT/US2012/047865.
International Search Report and Written Opinion dated Mar. 19, 2012 in co-pending PCT application No. PCT/US2011/045905.
International Search Report and Written Opinion dated Jun. 7, 2016 in co-pending PCT application No. PCT/US2016/018146.
International Search Report and Written Opinion received for PCT Patent Application No. PCT/US2012/047865, dated Feb. 26, 2013, 18 pages.
International Search Report received for PCT Application No. PCT/US2010/000826 dated Aug. 16, 2010, 5 pages.
Japanese communication, with English translation, dated Jun. 7, 2016 in co-pending Japanese patent application No. 2015-545930.
Office Action dated Oct. 23, 2013 in co-pending U.S. Appl. No. 13/436,043.
Office Action dated Mar. 24, 2015 in co-pending U.S. Appl. No. 13/436,043.
Office action dated Jun. 14, 2016 in co-pending U.S. Appl. No. 13/194,227.
Segers et al., "Classification of Pseudomonas diminuta Leifson and Hugh 1954 and Pseudomonas vesicularis Büsing, Döll, and Freytag 1953 in *Brevundimonas* gen. nov. as *Brevundimonas diminuta* comb. nov. and *Brevundimonas vesicularis* comb. nov., Respectively," Int J Syst Bacteriol, 44(3): 499-510 (Jul. 1994).
Extended European Search Report received for EP patent Application No. 17195327, dated Aug. 16, 2018, 10 pages.
Hazel, "Ensuring Safety pf Biopharmaceuticals:Virus and Prion Safety Considerations," Filtration and Purification in the Biopharmaceutical Industry, 543-577 (2008).
Ma et al., "Ultra Fine Cellulose Nanofibers: New Nano-Scale Materials for Water Purification," J Mater Chem, 21:7507-7510 (2011).
Reis, et al., "Membrane Separations in Biotechnology", Current Opinion in Biotechnology, 2001, vol. 12, pp. 208-211.
Tang, et al., "Design and Fabrication of Electrospun Polyethersulfone Nanofibrous Scaffold for High-flux Nanofiltration Membranes", Journal of Polymer Science, vol. 47, Aug. 16, 2009, pp. 2288-2300.

Strathmann, "Preparation of Microporous Membranes by Phase Inversion Processes", Membranes and Membrane Processes, 1986, pp. 115-135.
Grzenia, et al., "Tangential flow filtration for virus purification", Journal of Membrane Science 321, May 21, 2008, pp. 373-380.
International Preliminary Report on Patentability for PCT Application No. PCT/US2011/045805, dated Feb. 7 2013, 7 pages.
International Search Report and Written Opinion received for PCT Application No. PCT/US2012/047665 dated Jan. 10, 2012, 8 pages.
International Preliminary Report on Patentability for PCT Application No. PCT/US2015/037055 dated Jan. 5, 2017, 7 pages.
Schwartz, "Diafiltration for Desalting or Buffer Exchange", BioProcess International, May 2003, pp. 43-49.
Sterlitech Corporation, "What is Cross Flow Velocity? | Environmental XPRT", Available online at https://www.environmental-expert.com/articles/what-is-cross-flow-velocity-703133. Obtained online Aug. 29, 2019., May 26, 2017, 5 pages.
Jiang, et al., Professional Knowledge of Traditional Chinese Pharmacology, Jun. 2007, p. 233.
Huang, et al., "A Review on Polymer Nanofibers by Electro-Spinning Applications in Nanocomposites", Composites Sci. Tech., 2003, vol. 63, pp. 2223-2253.
Sajid, et al., "Designs, Formats and Applications of Lateral Flow Assay: A Literature Review", Journal of Saudi Chemical Society, Sep. 16, 2014, vol. 19, pp. 689-705.
Extended European Search Report issued in European Application No. 12814718.8, dated Feb. 20, 2015, 8 pages.
Extended European Search Report received for European Patent Application No. 12765651.0, dated Oct. 16, 2014, 9 pages.
Grzenia et al., "Tangential Flow Filtration for Virus Purification", Journal of Membrane Science 321, 2008, pp. 373-380.
Jung et al., "Detection and Treatment of Mycoplasma Contamination in Cultured Cells", Chang Gung Medical Journal, vol. 26, No. 4, Apr. 2003, pp. 250-258.
Ladewig et al., "Fundamentals of Membrane Processes", Chapter 2, Fundamentals of Membrane Bioreactors, Springer, Singapore, 2017, pp. 13-37.
Reinholt et al., "Developing New Materials for Paper-Based Diagnostics using Electrospun Nanofibers", Analytical and Bioanalytical Chemistry, vol. 406, No. 14, Sep. 26, 2013, pp. 3297-3304.
Wisher Martin, "Biosafety and Product Release Testing Issues Relevant to Replication-Competent Oncolytic Viruses", Cancer Gene Therapy, vol. 9, Sep. 12, 2002, pp. 1056-1061.

\* cited by examiner

NANOFIBER CONTAINING COMPOSITE MEMBRANE STRUCTURES

CROSS-REFERENCED TO RELATED APPLICATIONS

This application claims the benefit of U.S. Provisional Patent Application No. 61/470,705, filed on Apr. 1, 2011, the entire contents of which are incorporated by reference herein.

DESCRIPTION OF THE INVENTION

Field of the Invention

The present invention relates generally to liquid filtration media. In certain embodiments, the invention provides a composite liquid filtration platform and methods of using and making the same for the retention of microorganisms from a filtered liquid.

Background of the Invention

Synthetic polymers have been formed into webs of very small diameter fibers, (i.e., diameters on the order of a few microns (μm) or less), using various processes such as melt blowing, electrostatic spinning and electroblowing. Such webs have been shown to be useful as liquid barrier materials and filters. Often they are combined with stronger substrates to form composites.

Composite porous structures are widely used in filtration and separation applications. The term "composite" as used herein, implies that a combination of two or more membranes of different pore sizes, pore morphology and/or materials are used to create the final composite porous structure.

In membrane filtration for example, a composite can contain two or more porous layers having distinctly different pore structures. By combining two or more layers of porous material having a distinctly different pore structures in a composite filtration membrane, significant gains can be achieved in filtration efficiency, throughput, and mechanical robustness. By way of example, composites can be formed by subsequent layering of separately manufactured porous materials, casting a second or more layers onto a preformed first layer, laminating two or more preformed layers together, or by co-forming two or more layers simultaneously, as taught, for example, in U.S. Pat. No. 7,229,665 assigned to EMD Millipore Corporation.

Biopharmaceutical manufacturing is constantly looking for ways to streamline operations, combine and eliminate steps, and reduce the time it takes to process each batch of pharmaceutical drug substances. At the same time, market and regulatory pressures are driving biopharmaceutical manufacturers to reduce their costs. Since bacteria, mycoplasma and virus removal account for a significant percentage of the total cost of pharmaceutical drug substance purification, approaches that increase a porous membrane's filtration throughput and reduce purification processing time are very much in demand.

With the introduction of new prefiltration media and the corresponding increases in throughput of bacteria, mycoplasma and virus retentive filters, the filtration of feed streams is becoming flux-limited. Thus, dramatic improvements in the permeability of bacteria, mycoplasma and virus retentive filters will have a direct beneficial impact on the cost of a bacteria, mycoplasma and virus filtration step(s).

Filters used in liquid filtration can generally be categorized as either fibrous non-woven media filters or porous film membrane filters.

Porous film membrane liquid filters or other types of filtration media can be used either unsupported or in conjunction with a porous substrate or support. Porous film liquid filtration membranes, which typically have pore sizes smaller than porous fibrous non-woven media, can be used in:

(a) microfiltration (MF), wherein particulates filtered from a liquid are typically in the range of about 0.1 μm to about 10 μm;

(b) ultrafiltration (UF), wherein particulates filtered from a liquid, are typically in the range of about 2 nanometers (nm) to about 0.1 μm; and (c) reverse osmosis (RO), wherein particulate matter filtered from a liquid, are typically in the range of about 1 Å to about 1 nm.

Retrovirus-retentive membranes are usually considered to be on the open end of ultrafiltration membranes.

High permeability and, high reliable retention are two parameters desired in a liquid filtration membrane. There is, however, a trade-off between these two parameters, and for the same type of liquid filtration membrane, greater retention can be achieved by sacrificing permeability. The inherent limitations of conventional processes for making liquid filtration membranes prevent membranes from exceeding a certain threshold in porosity, and thus limits the magnitude of permeability that can be achieved at any given pore size.

Fibrous non-woven liquid filtration media include, but are not limited to, non-woven media formed from spunbonded, melt blown or spunlaced continuous fibers; hydroentangled non-woven media formed from carded staple fiber and the like, and/or combinations thereof. Typically, fibrous non-woven media filters used in liquid filtration have pore sizes generally greater than about 1 micron (μm).

Non-woven materials are widely used in the manufacture of filtration products. Pleated membrane cartridges usually include non-woven materials as a drainage layer (for example, see U.S. Pat. Nos. 6,074,869, 5,846,438, and 5,652,050, each assigned to Pall Corporation; and U.S. Pat. No. 6,598,749 assigned to Cuno Inc, now 3M Purification Inc.)

Non-woven microporous materials can also be used as a supporting screen for an adjacent porous membrane layer located thereon, such as Biomax® ultrafiltration membranes by EMD Millipore Corporation, of Billerica, Mass.

Non-woven microporous materials can also be used as supporting skeletons to increase the strength of a porous membrane located on the non-woven microporous structure, such as Milligard™ filters also available from EMD Millipore Corporation.

Non-woven microporous materials can also be used for "coarse prefiltration" to increase the capacity of a porous membrane placed downstream of the non-woven microporous material, by removing suspended particles having diameters that are generally greater than about 1 μm. The porous membrane usually provides a critical biosafety barrier or structure having a well-defined pore size or molecular weight cut-off. Critical filtration is characterized by expected and validatable assurance of a high degree of removal (typically >99.99%, as defined by specified tests) of microorganisms and viral particles. Critical filtration is routinely relied upon to ensure sterility of liquid drug and liquid biopharmaceutical formulations at multiple manufacturing stages, as well as at point of use.

Melt-blown and spunbonded fibrous media are often referred to as "traditional" or "conventional" non-wovens. Fibers in these traditional non-wovens are usually at least about 1,000 nm in diameter, therefore the effective pore sizes in traditional non-wovens are greater than about one micron. The methods of manufacturing traditional non-wovens typically lead to highly inhomogeneous fiber mats.

Historically, the random nature of conventional non-woven mat formation, such as by melt-blowing and spun-bonding, has led to the general assumption that non-woven mats are unsuitable for any critical filtration of liquid streams, and as such, filtration devices incorporating conventional non-wovens mats typically use these mats for prefiltration purposes only in order to increase the capacity of a porous critical filtration membrane placed downstream of the conventional non-wovens mats.

Another type of non-woven includes electrospun nanofiber non-woven mats, which, like "traditional" or "conventional" non-wovens have been generally assumed unsuitable for the critical filtration of liquid streams. (See for example, Bjorge et al., Performance assessment of electrospun nanofibers for filter applications, Desalination, 249, (2009), 942-948).

Electrospun polymeric nanofiber mats are highly porous, wherein the "pore" size is approximately linearly proportional to the fiber diameter, and the porosity is relatively independent of the fiber diameter. The porosity of an electrospun nanofiber mat usually falls in the range of about 85% to 90%, resulting in a nanofiber mat that demonstrates dramatically improved permeability when compared to immersion cast membranes having a similar thickness and pore size rating. The porosity advantages of electrospun polymeric nanofiber mats over porous membranes becomes amplified in the smaller pore size ranges typically required for virus filtration, because of the reduced porosity of UF membranes discussed supra.

Electrospun nanofiber non-woven mats are produced by spinning polymer solutions or melts using electric potential rather than meltblown, wetlaid or extrusion manufacturing processes used in making conventional or traditional non-wovens. The fiber diameters typically obtained by electrospinning are in the range of 10 nm to 1,000 nm, and are one to three orders of magnitude smaller than conventional or traditional non-wovens.

Electrospun nanofiber are formed by putting a dissolved or molten polymer material adjacent to a first electrode and applying an electrical potential such that the dissolved or molten polymer material is drawn away from the first electrode toward a second electrode as a fiber. In the process of manufacturing electrospun nanofiber mats, the fibers are not forced to lay down in mats by blown hot air or other mechanical means that can lead to a very broad pore size distribution. Rather, electrospun nanofibers form a highly uniform mat because of the mutual electrical repulsion between the electrospun nanofibers.

WO 2008/109117, assigned to E. I. Du Pont De Nemours and Company, teaches using a porous nanofiber layer as a depth filtration layer (i.e., a prefilter) for an adjacent porous membrane that has a 3.7 LRV (i.e., LRV is defined as logarithmic retention value where 3 LRV is equal to 0.999 filtration efficiency) for a certain particle size. WO 2008/109117 teaches that the nanofiber layer has a filtration efficiency rating of at least 95% for a particle size at which the membrane is rated with an LRV of 3.7 or greater. WO 2008/109117 purports to teach that the role of critical filtration is reserved for the porous membrane, rather than the nanofiber layer.

WO 2010/107503, assigned to EMD Millipore Corporation, teaches nanofiber mats having a specific thickness and fiber diameter offer an improved combination of liquid permeability and microorganism retention. Generally, nanofiber mats offer 2-10 times better permeability than their porous membrane counterparts of comparable retention, this is thought to be a consequence of the nanofiber mats having a higher porosity (~90% vs. 70-80% for a typical wet casting porous membrane).

Electrospun nanofiber mats can be manufactured by depositing fibers on a conventional spun-bonded non-woven fabric (examples of a face to face interface of a non-woven and a nanofiber layer are taught in WO 2009/010020 assigned to Elmarco s.r.o.; and in US Patent Application Publication No. 2009/0199717 assigned to Clarcor Inc., each incorporated herein by reference in their entirety). In each of these approaches, the roughness of the surface of the supporting non-woven fabric may propagate into the nanofiber layer causing potential non-uniformity of the nanofiber structure, thereby potentially compromising retention characteristics.

U.S. Pat. No. 7,585,437 issued to Jirsak et al. teaches a nozzle-free method for producing nanofibers from a polymer solution using electrostatic spinning and a device for carrying out the method.

WO 2003/080905 assigned to Nano Technics Co. LTD., incorporated herein by reference in its entirety, teaches an electroblowing process, wherein a stream of polymeric solution comprising a polymer and a solvent is fed from a storage tank to a series of spinning nozzles within a spinneret, to which a high voltage is applied and through which the polymeric solution is discharged. Compressed air, which may optionally be heated, is released from air nozzles disposed in the sides of, or at the periphery of, the spinning nozzle. The compressed air is directed generally downward as a blowing gas stream envelopes and forwards the newly issued polymeric solution, thereby aiding in the formation of a nanofibrous web, which is collected on a grounded porous collection belt located above a vacuum chamber.

U.S. Patent Application Publication No. 2004/0038014 to Schaefer et al. teaches a nonwoven filtration mat comprising one or more layers of a thick collection of fine polymeric microfibers and nanofibers formed by electrostatic spinning for filtering contaminants.

U.S. Patent Application Publication No. 2009/0199717 to Green teaches a method of forming electrospun fiber layers on a substrate layer, the electrospun fibers a significant amount of fibers with a diameter of less than 100 nanometers (nm).

Bjorge et al., in Desalination 249 (2009) 942-948, teach electrospun Nylon nanofiber mats having a nanofiber diameter of about 50 nm to 100 nm, and a thickness of about 120 µm. The measured bacteria LRV for non-surface treated fibers is 1.6-2.2. Bjorge et al. purportedly conclude that bacteria removal efficiency of nanofiber electrospun mats is unsatisfactory.

Gopal et al., in Journal of Membrane Science 289 (2007) 210-219, teach electrospun polyethersulfone nanofiber mats, wherein the nanofibers have a diameter of about 470 nm. During liquid filtration, the nanofiber mats act as a screen to filter out particles above 1 µm, and as a depth filter (e.g., prefilter) for particles under 1 micron.

Aussawasathien et al., in Journal of Membrane Science, 315 (2008) 11-19, teach electrospun nanofibers having a diameter of about 30 nm to 110 nm used in the removal of polystyrene particles having a diameter of about 0.5 µm to 10 µm.

WO 2010/120668 to Choi et al., teach a nanofiber layer having a 0.2 µm rating combined with a much tighter ultra-high molecular weight (UPE) membrane (e.g., having about a 5 nm rating), purportedly resulting in improved retention of polystyrene particles in the presence of surfactants. In each of the examples provided, the membranes have higher retention compared to the nanofiber layer alone. It appears that the addition of the nanofiber layer to the membrane does not result in a measurable increase of combined bubble point and leads to an incremental increase in retention compared to the membrane itself. As discussed supra, nanofiber mat teachings purportedly teach using nanofiber mats as a prefilter, and use the porous membranes to provide critical filtration and retention assurance properties.

However, none of the nanofiber mat teachings discussed supra teach using a nanofiber mat formed on a porous membrane support, wherein retention assurance and critical filtration properties are provided by the nanofiber mat, not the porous membrane; and the prefilter properties are supplied by the porous membrane support, not the nanofiber mat.

What is needed is a porous electrospun nanofiber composite filtration medium that would be readily scalable, adaptable to processing volumes of sample fluids ranging from milliliters to thousands of liters, and capable of use with a variety of filtration processes and devices such that the electrospun nanofiber layer provides retention assurance and critical filtration properties, and the porous support the nanofiber layer is formed on provides prefiltration properties. The invention is directed to these, as well as other objectives and embodiments.

SUMMARY OF THE INVENTION

The present invention addresses, among other things, the non-uniformity and capacity deficiencies often associated with composite non-wovens liquid filtration structures. The new composite liquid filtration platforms taught herein include porous composite filtration structures having a polymeric nanofiber layer collected on a porous membrane, such that when the composite filtration structures are used to filter a liquid or liquid streams the porous membrane is situated upstream of the polymeric nanofiber layer. Although the porous membrane acts as a substrate for capturing nanofibers in the production of the composite filtration structures, the porous membrane is also the prefilter used upstream from the polymeric nanofiber layer to remove particles from a liquid stream flowing through the composite filtration structure. That is, the nanofiber layer is positioned downstream from the porous membrane, and is used as the retentive layer for critical filtration to provide biosafety assurance, and is responsible for capturing microorganisms like bacteria, mycoplasma or viruses. Having the porous membrane side of the composite filtration structure as the prefilter (rather than the nanofiber layer which heretofore was previously used as the prefilter) and the thin, uniform and small pore size nanofiber layer used as the retentive biosafety assurance layer, the liquid filtration platform taught herein exhibits permeability advantages over conventional porous membranes or nanofiber mats spun on coarse non-wovens.

In certain embodiments, the invention provides a porous composite media including a porous membrane and a porous polymeric nanofiber layer located on the membrane, wherein the pore size of the nanofiber layer is smaller than the pore size of the membrane.

In other embodiments, the invention provides porous composite media including a porous membrane and a porous polymeric nanofiber layer located on the membrane having a bubble point as measured with a suitable fluid of at least 20% greater than the bubble point of the membrane alone.

In certain embodiments, the invention provides a porous composite media including a porous membrane and a porous polymeric nanofiber layer located on the membrane, wherein the membrane is asymmetric and includes a tight side.

In other embodiments, the invention provides a porous composite media including a porous membrane and a porous polymeric nanofiber layer located on the membrane, wherein the nanofiber layer is symmetric.

In still other embodiments, the invention provides a porous composite media including a porous membrane and a porous polymeric nanofiber layer located on the membrane, wherein the nanofiber layer is an electrospun mat.

In other embodiments, the invention provides a porous composite media including a porous membrane and a porous polymeric nanofiber layer located on the membrane, wherein the nanofiber layer comprises a blend of polymers, copolymers, and mixtures thereof.

In another embodiment, the invention provides a porous composite media including a porous membrane and a porous polymeric nanofiber layer located on the membrane, wherein the nanofiber layer comprises an aliphatic polyamide.

In another embodiment, the invention provides a composite liquid filtration medium structure having a porous membrane prefilter and a critical filtration porous nanofiber retentive layer collected on the membrane. The thickness of the porous nanofiber layer ranges from about 1 μm to about 500 μm. The effective pore size of the porous nanofiber layer is generally defined by the fiber diameter, which is chosen based on the desired microorganism or particle to be retained. The effective pore size of the porous nanofiber layer, as measured by bubble point test provided infra, ranges from about 0.05 μm for retrovirus removal to about 0.5 μm for bacteria removal.

In another embodiment, the invention provides a composite liquid filtration platform including an electrospun porous nanofiber layer having thickness ranging from about 10 μm to about 500 μm.

In further embodiments, the invention provides a composite liquid filtration platform including a porous electrospun nanofiber layer having thickness ranging from about 20 μm to about 300 μm.

In still other embodiments, the invention provides a composite liquid filtration platform including a porous electrospun nanofiber layer having thickness ranging from about 50 μm to 200 μm.

In another embodiment, the invention provides porous composite media for liquid filtration including a porous asymmetric membrane having a tight side, an open side and a pore size increasing in size between the tight side and open side, and a porous polymeric nanofiber layer located on the tight side, wherein the pore size on the tight side of the membrane is larger than pore size of the polymeric nanofiber layer.

In certain embodiments, the invention provides a composite filtration device for use in critical liquid filtration including a prefilter having a porous asymmetric membrane having a tight side, an open side and a pore size increasing in size between the tight side and open side, and a retentive filter having a porous polymeric nanofiber layer located on the tight side of the asymmetric membrane, wherein the pore size on the tight side of the asymmetric membrane is larger than pore size of the polymeric nanofiber layer.

In another embodiment, the present invention is directed to a process of forming a porous composite liquid filtration platform from one or more porous electrospun polymeric nanofibers formed from a polymer solution using an electrospinning apparatus, and subjecting the solution to an electric potential greater than about 10 kV, and collecting the electrospun polymer fiber(s) on a porous supporting membrane having a smooth surface. The smooth surface structure of the supporting membrane results in a smooth and a uniform porous nanofiber mat (unlike a nanofiber mat formed on a non-woven collecting support have a coarse support surface). Smooth and uniform porous nanofiber mats typically have greater retention, i.e., porous nanofiber mats having the same thickness and permeability would have greater particle removal properties when produced on a smoother membrane surface than on a coarse non-woven. Alternatively, porous nanofiber mats of similar retention would be thinner and more permeable if produced on a smooth membrane.

In certain other embodiments, the invention provides a porous composite liquid filtration device including a porous composite liquid filtration platform Having a liquid filtration composite medium featuring an electrospun polymeric porous nanofiber retentive biosafety assurance layer disposed on a porous membrane substrate prefilter.

In still another embodiment the invention provides a liquid filtration platform having a porous composite medium including a critical biosafety porous nanofiber layer collected on a porous prefilter membrane. The composite liquid filtration platform is used to filter a liquid stream and capture, among other substances, microorganisms like bacteria, mycoplasma or viruses that may be present in the liquid. The liquid filtration platform accomplishes this by having the liquid stream first encounter the porous prefilter membrane component on the porous composite medium followed by encountering the retentive nanofiber layer for critical filtration by capturing microorganisms, mycoplasma or viruses downstream from the prefilter layer.

Additional features and advantages of the invention will be set forth in the detailed description and claims, which follow. Many modifications and variations of this invention can be made without departing from its spirit and scope, as will be apparent to those skilled in the art. It is to be understood that the foregoing general description and the following detailed description, the claims, as well as the appended drawings are exemplary and explanatory only, and are intended to provide an explanation of various embodiments of the present teachings. The specific embodiments described herein are offered by way of example only and are not meant to be limiting in any way.

BRIEF DESCRIPTION OF THE DRAWINGS

The accompanying drawings, which are incorporated in and constitute a part of this specification, illustrate the presently contemplated embodiments of the invention and, together with the description, serve to explain the principles of the invention.

DESCRIPTION OF THE EMBODIMENTS

Figure 1:
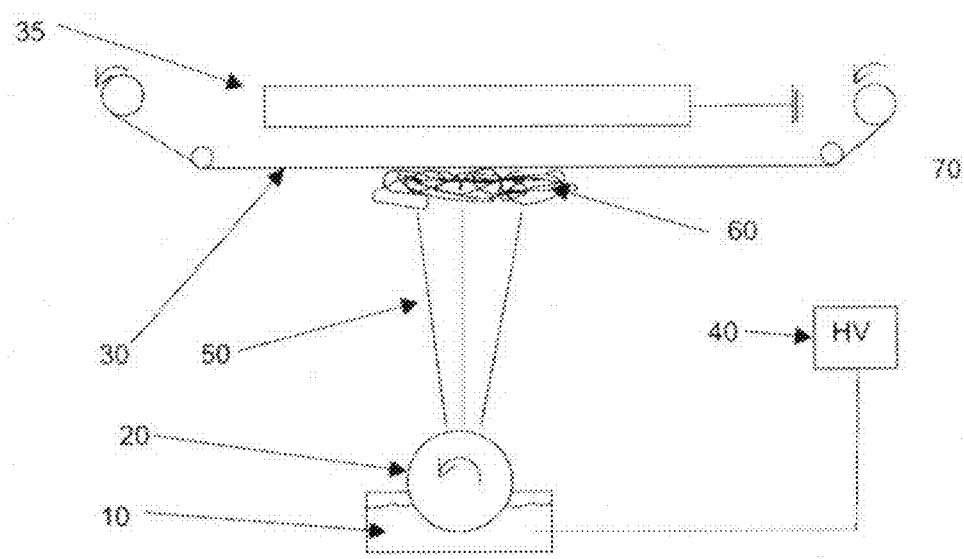
FIG. 1 is a schematic of the process of electrospinning a nanofiber onto a moving web according to one embodiment of the invention.
Figure 2:
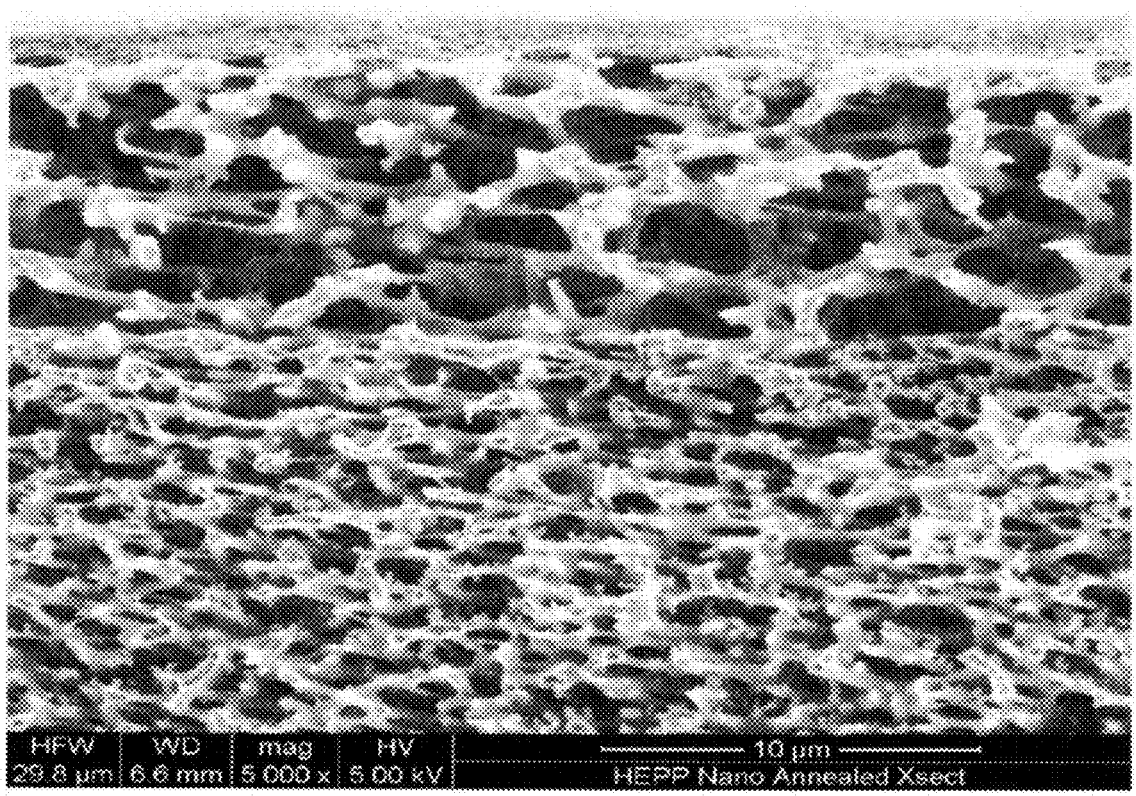
FIG. 2 shows an electron micrograph of a composite liquid filtration platform according to an embodiment of this invention featuring a porous composite filtration structure having a polymeric nanofiber layer collected on a porous membrane.

All publications, patents and patent applications cited herein, whether supra or infra, are hereby incorporated by reference in their entirety to the same extent as if each individual publication, patent or patent application was specifically and individually indicated to be incorporated by reference.

Before describing the present invention in further detail, a number of terms will be defined. Use of these terms does not limit the scope of the invention but only serve to facilitate the description of the invention.

As used herein, the singular forms "a", "an", and "the" include plural referents unless the context clearly dictates otherwise.

For the purposes of this specification and appended claims, all numeric values expressing quantities of ingredients, percentages or proportions of materials, reaction conditions, and other numerical values used in the specification and claims, are to be understood as being modified in all instances by the term "about", whether or not the term "about" is expressly indicated.

Accordingly, unless indicated to the contrary, the numerical parameters set forth in the following specification and attached claims are approximations. Notwithstanding that the numerical ranges and parameters setting forth the broad scope of the invention are approximations, the numerical values set forth in the specific examples are reported as precisely as possible. Moreover, all ranges disclosed herein are to be understood to encompass all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

As used herein, "membranes" are defined as porous bicontinuous structures, most commonly prepared by casting a polymer dispersion or solution into a desired shape, where the porous structure is formed by the so called "phase inversion" process. Those skilled in the art will readily recognize that phase inversion can be accomplished, for example, by inducing polymer precipitation in contact with gas phase, liquid phase, or by temperature. Nonlimiting examples of the desired shapes of the membrane include hollow fiber, flat sheet, or other articles. Fibrous materials, such as woven and non-woven fabrics or mats, usually have a discontinuous solid phase, which is formed by individual fibers entangled together. Fibrous materials are generally not classified as membranes.

As used herein, "asymmetric membranes" are characterized by having the pore size of the membrane vary as a function of location within the thickness of the membrane. The most common asymmetric membrane has a gradient structure, in which pore size gradually and continually increases from one surface (often referred to as the "tight" side) to the other (often referred to as the "open" side). Asymmetric membranes generally have a higher flux than symmetric membranes of comparable thickness and retention. When used in the configuration with their larger pore side upstream, asymmetric membranes have greater throughput in many cases as compared to the comparable symmetric membranes. See, for example U.S. Pat. No. 4,261,834, issued to D. M. de Winter, on Apr. 14, 1981. Asymmetric membranes have a thick, dense surface region, or in many case a skin formed on one surface and extending somewhat into its depth, e.g. a tight surface. See, U.S. Pat. No. 4,629,563, issued to W. Wrasidlo, on Dec. 16, 1986.

The term "calendering" refers to a process of passing a web through a nip between two rolls. The rolls may be in contact with each other, or there may be a fixed or variable gap between the roll surfaces.

The terms "filter medium", "filter media", "filtration media", or "filtration medium" refer to a material, or collection of material, through which a fluid carrying a microorganism contaminant passes, wherein microorganism is deposited in or on the material or collection of material.

The terms "flux" and "flow rate" are used interchangeably to refer to the rate at which a volume of fluid passes through a filtration medium of a given area.

The term "nanofiber" refers to fibers having diameters or cross-sections generally less than about 1 µm, typically varying from about 20 nm to about 800 nm.

The terms "optional" or "optionally" mean that the subsequently described event or circumstance may or may not occur, and that the description includes instances where the event occurs and instances where it does not.

The composite liquid filtration platforms of the present invention include, for example, a composite liquid filtration medium featuring a porous electrospun nanofiber liquid filtration layer deposited on a porous membrane substrate. The electrospun nanofibers preferably have an average fiber diameter of about 10 nm to about 150 nm, a mean pore size ranging from about 0.05 µm to about 1 µm, a porosity ranging from about 80% to about 95%, a thickness ranging from about 1 µm to about 100 µm, preferably from about 1 µm and about 50 µm, more preferably between 1 µm and 20 µm. The composite liquid filtration platforms taught herein have a water permeability greater than about 100 LMH/psi.

In addition, the composite liquid filtration platforms taught herein have a high retention of microorganisms providing at least 3 LRV retrovirus removal and at least 6 LRV of bacteria and mycoplasma, and preferably at least 6 LRV of retrovirus removal and at least 9 LRV of bacteria and mycoplasma.

The electrospun nanofibers are prepared from a broad range of polymers and polymer compounds, including thermoplastic and thermosetting polymers. Suitable polymers include, but are not limited to, nylon, polyimide, aliphatic polyamide, aromatic polyamide, polysulfone, cellulose, cellulose acetate, polyether sulfone, polyurethane, poly(urea urethane), polybenzimidazole (PBI), polyetherimide, polyacrylonitrile (PAN), poly(ethylene terephthalate), polypropylene, polyaniline, poly(ethylene oxide), poly(ethylene naphthalate), poly(butylene terephthalate), styrene butadiene rubber, polystyrene, poly(vinyl chloride), poly(vinyl alcohol), poly(vinylidene fluoride), poly(vinyl butylene), polymethylmethacrylate (PMMA), copolymers, derivative compounds and blends and/or combinations thereof.

The term "pore size" or "effective pore size", as used interchangeably herein, is a measure of the porous structure that is predictive of its ability to retain particles of a certain size. The effective pore size of a membrane or electrospun mat can be measured using conventional techniques such as bubble point, liquid-liquid porometry, and challenge test with particles of a certain size. While several methods can be used to determine the pore size and each can produce a slightly different measurement, the same measurement method is used herein when a comparison is made between pore sizes of different structures, for example between a membrane and an electrospun mat.

DESCRIPTION OF THE EMBODIMENTS

FIG. 1 schematically depicts one embodiment of the present invention wherein the composite liquid filtration platform includes a composite liquid filtration medium having an electrospun porous nanofiber mat 60 made from a single electrospun polymeric nanofiber. The single nanofiber is made by a single pass of a moving collection apparatus 30 positioned between a charged rotating drum 20 and a collecting electrode 35 through the electrospinning process. It will be appreciated that a nanofiber web or mat can be formed by one or more spinning drums 20 running simultaneously above the same moving collection apparatus 30.

In FIG. 1, the moving collection apparatus 30 is preferably a moving collection belt positioned within an electrostatic field 50 between the spinning charged rotating drum 20 and the electrode 35. The polymer solution 10 can be subjected to an electrical potential from a high voltage source 40, such that an electrospun polymer fiber is produced in the electric field 50.

In other embodiments taught herein, the electrospun fibrous mat 60 is formed by depositing electrospun nanofiber(s) from a nylon solution. The resulting nanofiber mat preferably has a basis weight between about 1 g/m$^2$ and about 20 g/m$^2$, as measured on a dry basis, (i.e., after the residual solvent has evaporated or been removed).

In other embodiments taught herein, the composite liquid filtration platform includes a variety of porous single or multilayered membrane substrates or supports that can be arranged on a moving collection belt to collect and combine with electrospun nanofiber(s) forming an electrospun nanofiber mat thereon.

Non-limiting examples of single or multilayered porous substrates or supports include porous film membranes. Porous film membranes are produced from a variety of thermoplastic polymers, including polyamides, polysulfones, polyvinylidene fluoride, polytetrafluoroethylene, cellulose, cellulose esters, polyacrylonitrile, etc. Methods of producing porous film membranes include solution phase inversion, temperature-induced phase separation (TIPS), vapor-induced phase separation (VIPS), solvent and chemical etching, room temperature and heat-assisted biaxial stretching, and combinations thereof.

The surface roughness of the porous membrane substrate of the composite filtration medium that captures or collects the electrospun nanofibers was observed to at least partially determine the properties in the resulting nanofiber layer of the final composite filtration structure. For example, we have observed that the smoother the surface of the substrate used to collect the electrospun nanofibers, the more uniform the resulting nanofiber layer structure. Imprints of patterns on the surface of a coarse spun-bonded nonwoven substrate used to collect the electrospun nanofiber layer were observed to directly transfer onto the resulting electrospun nanolayer layer collected thereon. However, such pattern imprints were not seen when an electrospun nanofiber layer was collected on a porous membrane substrate having a smooth surface. Electrospun nanofiber layers collected on the smooth surface of the porous membrane resulted in a "featureless" nanofiber layer formed thereon.

In certain embodiments of the composite liquid filtration platform taught herein, an electrospun nanofiber layer is bonded to a porous membrane substrate or support. Bonding may be accomplished by methods well known in the art, including but not limited to thermal calendering between heated smooth nip rolls, ultrasonic bonding, and through gas bonding. Bonding the electrospun nanofiber layer to the membrane support increases the strength of the composite, and the compression resistance of the composite, such that the resulting composite filtration medium is capable of withstanding forces associated with forming the composite filtration platform into useful filter shapes and sizes, or when installing the composite filtration platform into a filtration device.

In other embodiments of the composite liquid filtration platform taught herein, the physical properties of the porous electrospun nanofiber layer such as thickness, density, and the size and shape of the pores may be affected depending on the bonding methods used between the nanofiber layer and the membrane support. For instance, thermal calendaring can be used to reduce the thickness and increase the density and reduce the porosity of the electrospun nanofiber layer, and reduce the size of the pores. This in turn decreases the flow rate through the composite filtration medium at a given applied differential pressure.

In general, ultrasonic bonding will bond to a smaller area of the electrospun nanofiber layer than thermal calendaring, and therefore has a lesser effect on thickness, density and pore size electrospun nanofiber layer.

Hot gas or hot air bonding generally has minimal effect on the thickness, density and pore size of the electrospun nanofiber layer, therefore this bonding method may be preferable in applications in which maintaining higher fluid flow rate is desired.

When thermal calendering is used, care must be taken not to Over-bond the electrospun nanofiber layer, such that the nanofibers melt and no longer retain their structure as individual fibers. In the extreme, over-bonding will result in the nanofibers melting completely such that a film is formed. One or both of the nip rolls used is heated to a temperature of between about ambient temperature, e.g., about 25° C. and about 300° C. The porous nanofiber medium and/or porous support or substrate, can be compressed between the nip rolls at a pressure ranging from about 0 lb/in to about 1000 lb/in (178 kg/cm).

Calendering conditions, e.g., roll temperature, nip pressure and line speed, can be adjusted to achieve the desired solidity. In general, application of higher temperature, pressure, and/or residence time under elevated temperature and/or pressure results in increased solidity.

Other mechanical steps, such as stretching, cooling, heating, sintering, annealing, reeling, unreeling, and the like, may optionally be included in the overall process of forming, shaping and making the composite filtration medium as desired.

The porosity of the composite filtration medium taught herein can be modified as a result of calendaring, wherein the porosity ranges from about 5% to about 90%.

In certain embodiments of the composite liquid filtration platform taught herein, the porous membrane support substrate (i.e., used to collect the electrospun nanofiber layer) includes at least one layer of a porous membrane adjacent another layer of a porous membrane. For example, layering of the porous membrane substrate improves particle retention. Layering porous membrane substrates of the same or different composition is also used to improve the composite filtration medium throughput.

Other considerations for choosing a multi-layered porous membrane substrate in the composite liquid filtration platform include economics and convenience of the composite liquid filtration media, the processes used to manufacture the liquid filtration device where the composite liquid filtration media may be installed, ease of sterilization and validation. The porous membrane substrates used to collect the electrospun nanofiber layer(s) can be a single-layer or in a multi-layer configuration, wherein the preferred number of layers that make up the porous membrane substrate is often selected based on practical considerations.

Additionally, the benefits of the composite liquid filtration platform as taught herein were observed to be more pronounced at lower nanofiber mat thicknesses, and therefore shorter spin times. These benefits can also be utilized on a moving web that will directly translate into faster production line speeds. By spinning the nanofiber layer on a smoother support surface, the same bubble point was observed to be achieved but at a lower nanofiber layer thickness. These advantages result in both economic benefits from faster production rate, and in greater permeability of a thinner nanofiber layer.

In other embodiments taught herein, the composite liquid filtration platform includes:

1) a porous membrane support which does not demonstrate full retention of a retrovirus in a single layer, such as:
   i) the 0.1 μm rated Millipore Express® membrane available from EMD Millipore Corporation, Billerica, Mass.,
   ii) the Retropore™ membrane available from EMD Millipore Corporation, Billerica, Mass., or iii) the 0.45 μm rated nylon membrane or 0.60 μm rated nylon membrane by Membrana GmbH Wuppertal, Germany, and 2) a polymeric electrospun nanofiber layer, deposited on the porous membrane support, and having a thickness less than is used to achieve full retrovirus retention at higher permeability, filtration capacity (due to porous membrane prefiltration) and lower nanofiber production cost (due to the low nanofiber layer thickness).

In order to improve the throughput of electrospun nanofiber non-woven mats, electrospun nanofibers are produced by collecting the nanofibers on the tight side of an asymmetric porous support membrane. The final structure of the composite liquid filtration platform includes a composite filtration medium constructed such that the porous support membrane has bigger pores in its tightest portion as compared to the pore size of the electrospun nanofiber layer, so that the porous support membrane serves as a prefilter and is located upstream of the electrospun nanofiber layer. In this arrangement of the composite filtration platform, the asymmetric porous support membrane of the composite filtration medium provides the prefiltration capabilities, and the electrospun nanofiber layer provides the majority of the microorganism retention.

Two non-limiting examples of the composite liquid filtration platform taught herein include 1) a composite filtration structure or medium featuring a mycoplasma-retentive nanofiber mat (0.1 μm-rated) deposited on a 0.5 μm rated prefilter porous membrane support, such as Millipore Express® prefilter membrane by EMD Millipore Corporation, Billerica, Mass., and 2) a retrovirus removal nanofiber mat (pore size <0.1 μm) deposited on a 0.1 μm rated porous membrane support, such as Millipore Express® SHR membrane by EMD Millipore Corporation, Billerica, Mass.

While the composite liquid filtration platform featuring a prefiltration porous support membrane and a microorganism retentive nanofiber layer exhibits complete retention of microorganisms provided thereon, neither the porous support membrane nor the nanofiber component of this composite are required to demonstrate complete microorganism retention when tested alone. By way of a non-limiting example, a partially bacterial retentive nanofiber layer is spun on a partially bacterial retentive prefilter porous membrane support having a 0.5 μm rating, such as Millipore Express® SHC filter, by EMD Millipore Corporation, Billerica, Mass.

Process for Producing Electrospun Nanofibers

The processes for making the electrospun nanofiber layers are taught, for example in WO 2005/024101, WO 2006/131081, and WO 2008/106903, each incorporated herein by reference in their entirety, and each assigned to Elmarco s.r.o., of Liberec, Czech Republic.

WO 2005/024101, titled "A Method Of Nanofibres Production From Polymer Solution Using a Electrostatic Spinning And A Device For Carrying Out The Method", teaches, for example, producing nanofibers from a polymer solution inside a vacuum chamber using electrostatic spinning in an electric field created between a rotating charged electrode and a counter electrode having a different potential.

The polymer solution is held in a container having at least one polymer solution inlet and outlet. The inlet and outlet serve to circulate the polymer solution and maintain the polymer solution at a constant height level in the container.

An auxiliary drying air supply, which can be heated if needed, is located between the charged electrode and the counter electrode. One side of the rotating charged electrode is immersed in the polymer solution such that a portion of the solution is taken up by the outer surface of the rotating charged electrode and spun into the region of the vacuum chamber between rotating the charged electrode and the counter electrode where the electric field is formed. There the polymer solution forms Taylor cones having a high stability on the surface of the rotating charged electrode which presents locations for primary formation of the nanofibers.

The counter electrode has a cylindrical surface made of a perforated conducting material that forms one end of a vacuum chamber connected to a vacuum source. Part of the surface of the counter electrode located near the rotating charged electrode, serves as a conveyor surface for a backing fabric material which supports the electrospun nanofibers when deposited thereon. The backing fabric support material is positioned on an unreeling device arranged on one side of the vacuum chamber and on a reeling device arranged on the other side of the vacuum chamber.

The effects of the electric field cause the formed nanofibers to drift away to the counter electrode, and are consequently deposited on the surface of the backing fabric supporting material into a nanofiber layer. The thickness of the nanofiber is controlled using the velocity of the unreeling and the reeling devices.

The drift of the nanofibers away of the charged electrode to the counter electrode is promoted by streaming of air sucked into the vacuum chamber and passing along the polymer solution container and the charged electrode and passing through the backing fabric presenting plane supporting material of the nanofibers and the counter electrode.

Test Methods

Basis weight was determined according to ASTM procedure D-3776, "Standard Test Methods for Mass Per Unit Area (Weight) of Fabric", which is incorporated herein by reference in its entirety and reported in g/m².

Porosity was calculated by dividing the basis weight of the sample in g/m² by the polymer density in g/cm³, by the sample thickness in micrometers, multiplying by 100, and subtracting the resulting number from 100, i.e., porosity=100−[basis weight/(density×thickness)×100].

Fiber diameter was determined as follows: A scanning electron microscope (SEM) image was taken at 40,000 or 60,000 times magnification of each side of nanofiber mat sample. The diameter of ten (10) clearly distinguishable nanofibers were measured from each SEM image and recorded. Irregularities were not included (i.e., lumps of nanofibers, polymer drops, intersections of nanofibers, etc.). The average fiber diameter for both sides of each sample was calculated and averaged to result in a single average fiber diameter value for each sample.

Thickness was determined according to ASTM procedure D1777-64, "Standard Test Method for Thickness of Textile Materials", which is incorporated herein by reference in its entirety, and is reported in micrometers (μm).

Mean flow bubble point was measured according to ASTM procedure Designation E 1294-89, "Standard Test Method for Pore Size Characteristics of Membrane Filters Using Automated Liquid Porosimeter", by using automated bubble point method from ASTM Designation F 316 using a custom-built capillary flow porosimeter, in principle similar to a commercial apparatus from Porous Materials, Inc. (PMI), Ithaca, N.Y. Individual samples of 25 mm in diameter were wetted with isopropyl alcohol. Each sample was placed in a holder, and a differential pressure of air was applied and the fluid removed from the sample. The differential pressure at which wet flow is equal to one-half the dry flow (flow without wetting solvent) is used to calculate the mean flow pore size using software supplied by PMI.

Flux is the rate at which fluid passes through the sample of a given area and was measured by passing deionized water through filter medium samples having a diameter of 47 (9.6 cm$^2$ filtration area) mm. The water was forced through the samples using about 25 in Hg vacuum on the filtrate end via a side arm flask.

The effective pore size of the electrospun mat was measured using conventional membrane techniques such as bubble point, liquid-liquid porometry, and challenge test with particles of certain size. It is generally known that the effective pore size of a fibrous mat generally increases with the fiber diameter and decreases with porosity.

Bubble point test provides a convenient way to measure effective pore size. Bubble point is calculated from the following equation:

$$P = \frac{2\gamma}{r}\cos\theta,$$

where P is the bubble point pressure, γ is the surface tension of the probe fluid, r is the pore radius, and θ is the liquid-solid contact angle.

Membrane manufacturers assign nominal pore size ratings to commercial membrane filters, which are based on their retention characteristics.

Retrovirus Retention

Retrovirus retention was tested using the following test method. The bacteriophage PR772 challenge stream was prepared with a minimum titer of 1.0×10$^7$ pfu/mL in a phosphate buffer saline (PBS) solution. Porous media to be tested were cut in 25 mm discs and sealed in overmolded polypropylene devices of the same type as the OptiScale 25 disposable capsule filter devices commercially available from EMD Millipore Corporation. The devices include an air vent to prevent air locking, and have an effective filtration area of 3.5 cm$^2$. These devices were then challenged by the above mentioned stream at 5 psi pressure after being wet by water at 25 psi pressure. The test was terminated after 100 ml of filtrate collection or after 4 hours of filtration, whichever came first. Quantification of bacteriophages in the initial and final feed were conducted on plates incubated overnight using a light box and a colony counter. Corresponding log retention values (LRV) were calculated.

Mycoplasma Retention

Mycoplasma retention was measured by challenging the membranes with 8.77*10$^7$ colony forming units per square cm of membrane (CFU/cm$^2$). The devices were challenged with 50 ml of diluted *Acholeplasma laidlawii* (*A. laidlawii*) and then flushed with 50 ml of mycoplasma buffer for a total of 100 ml. The full 100 ml was then filtered through a 0.22 μm sterilization membrane. Then, the procedure as taught in WO 2009/032040, assigned to EMD Millipore Corporation, Billerica, Mass., was followed, wherein a method for retention testing sterilizing grade filters comprises: a) providing a stock of *A. laidlawii*; b) growing up the stock of *A. laidlawii* for about 24 hours or less in a single serum-free growth medium that supports cell growth to a high titer and yields a cellular morphology where the cells are small, degraded and spherical, thereby producing a bacterial culture; c) challenging a test filter by filtering the bacterial culture through the test filter at a known challenge level, thereby producing a filtrate downstream of the test filter; and d) detecting concentration of *A. laidlawii* in the filtrate. Serum-free growth media for cultivating or storing *A. laidlawii* are also described.

*Brevundimonas diminuta* (*B. diminuta*) retention was measured in accordance with ASTM procedure F838-83, "Standard Test Method for Determining Bacterial Retention of Membrane Filters Utilized for Liquid Filtration".

Nanofiber samples were produced on NS Lab 200, (Elmarco s.r.o. Liberec, CZ), a lab scale tool where nanofibers are collected on a porous support that is fixed over the spinning electrode. Samples prepared on this instrument will be referred to as "static mode".

Samples were also produced on a NS 3W1000U, (Elmarco s.r.o. Liberec, CZ), retrofitted with a 50 cm long electrode. On this instrument, samples were produced continuously in a roll to roll basis where the substrate moves over three spinning electrodes at a constant speed. This sample preparation method is referred to as "dynamic mode" in the Examples.

Hereinafter the composite liquid filtration platform will be described in more detail in the following examples. The examples of the present invention will demonstrate that a composite electrospun nanofiber mat can simultaneously possess both high permeability and high retention of bacteria, mycoplasma, or retrovirus.

Example 1

Comparison of electrospun nanofiber mats produced on a non-woven versus nanofiber mats produced on a membrane.

The composite liquid filtration platforms provided herein include nanofiber layers made by electrospinning a solution of Nylon 6 polymer. The Nylon 6 is supplied by BASF Corp., Florham Park, N.J., USA, under the brand name Ultramid® B24. The spinning solution was prepared by mixing 13% Nylon 6 (Ultramid® grade B24 N 02) with a blend of acetic acid, formic acid and water (2:2:1 weight ratio) for about 5 hours at 80° C. The viscosity of the resulting solution was about 100 cP. The solution was immediately spun using a 6-wire spinning electrode under 82 kV electric field at different collection times (spin time).

For nanofibers spun on conventional non-woven supports, an antistatically-coated non-woven spunbonded polypropylene material, available from ATEX Inc., Gainesville, Ga., USA under the brand name Axar A SBPP 30 gsm, was used.

For nanofibers spun on a porous membrane, a 0.22 μm rated asymmetric sterilization grade PES membrane, available as Express® SHF from EMD Millipore Corporation, was used.

The average fiber diameter of the electrospun mat produced was about 25-30 nm. In an effort to quantify the property changes associated with the different materials used for nanofiber mat collection, the IPA bubble point, as defined above, of the composite structures as a function of spin time (which is usually directly proportional to nanofiber mat thickness) was measured.

Figure 3:
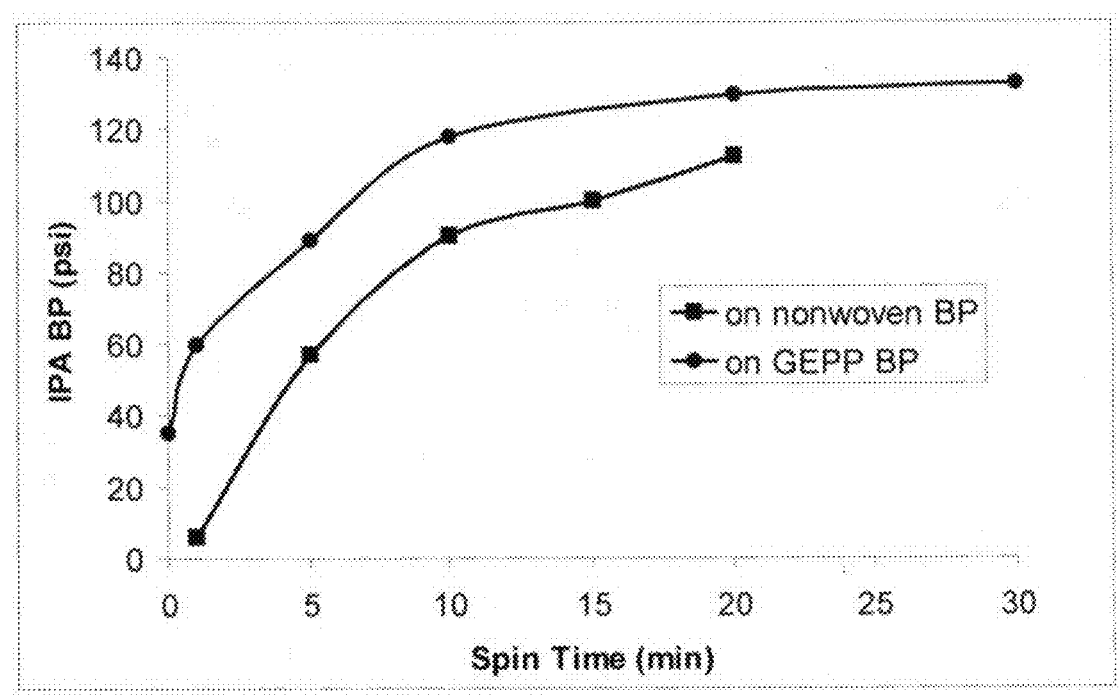
FIG. 3 depicts a comparison of IPA bubble points of a composite liquid filtration platform according to an embodiment of this invention featuring a porous composite filtration structure having a polymeric nanofiber layer collected on a porous membrane, and a comparative example of a nanofiber mat deposited on a coarse non-woven for the same spin times (and therefore same thickness of nanofiber mat).

FIG. 3 depicts the BP increase of 25 nm polyamide fibers spun on a nonwoven vs. an equivalent polyamide nanofiber spun on an asymmetric 0.22 μm rated membrane.

Example 2

Manufacture of mycoplasma-retentive composite liquid filtration platform including a composite filtration medium featuring a nanofiber layer and a support membrane.

Figure 4:
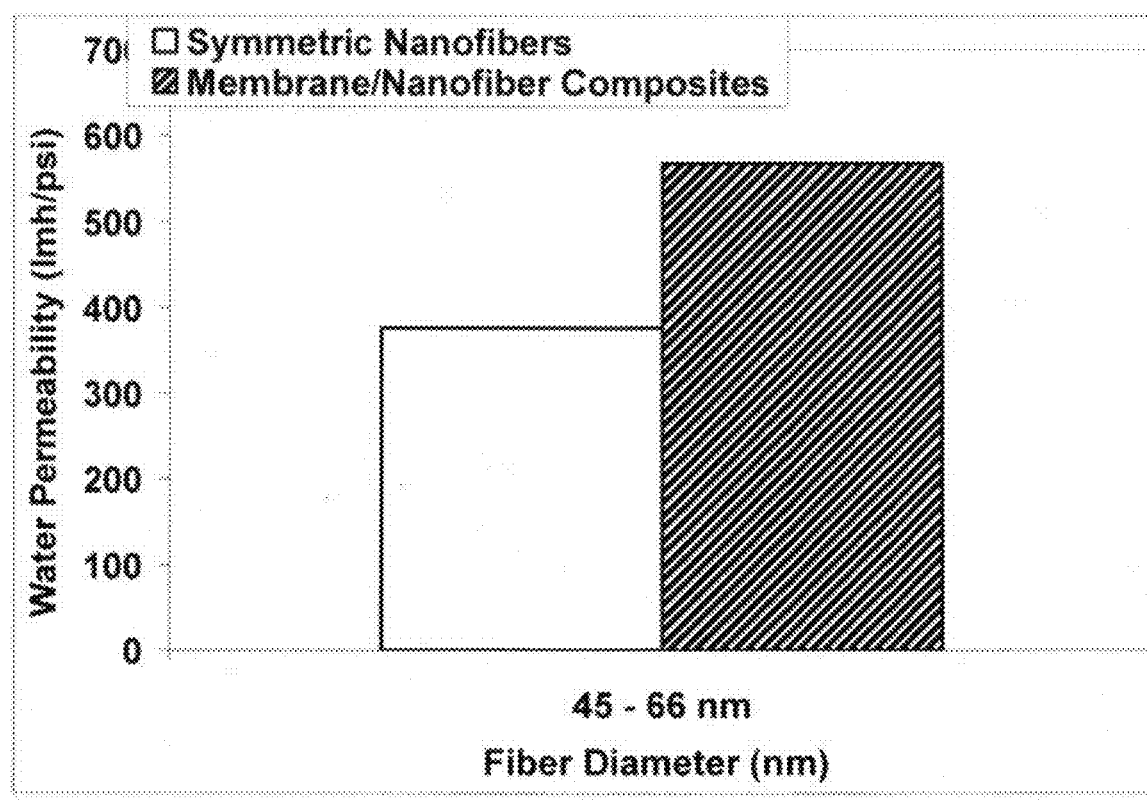
FIG. 4 depicts a comparison of water permeability for nanofibers with similar mycoplasma retention (>9 LRV): a comparative example of a nanofiber mat spun on a coarse non-woven and a composite liquid filtration platform according to an embodiment of this invention featuring a porous composite filtration structure having a polymeric nanofiber layer collected on a porous membrane.

The spinning solution was prepared by mixing 14% Nylon 6 (Ultramid® B27 E 01) solution with a blend of acetic acid, formic acid and water (2:2:1 weight ratio) for 5 hours at 80° C. The solution was immediately spun using a 6-wire spinning electrode under 82 kV electric field. The non-woven supported mats were spun in static mode with a spin time of 45 minutes. The porous membrane/nanofiber composite samples were spun in dynamic mode where the substrate, a membrane with a 0.5 µm rating (prefilter layer of Millipore Express® SHC filter, EMD Millipore Corporation, Billerica, Mass.), was moving over spinning electrodes at a constant speed. The nanofiber layer was peeled off the non-woven substrate for testing. When the nanofiber was electrospun on a membrane, the membrane was kept together with the nanofiber in subsequent testing. Next, disk samples were cut and placed in overmolded devices described above for retention testing. FIG. 4 shows permeabilities of two samples of similar mycoplasma retention (>9 LRV): nanofiber mat spun on coarse non-woven and on membrane.

Example 3

Figure 5:
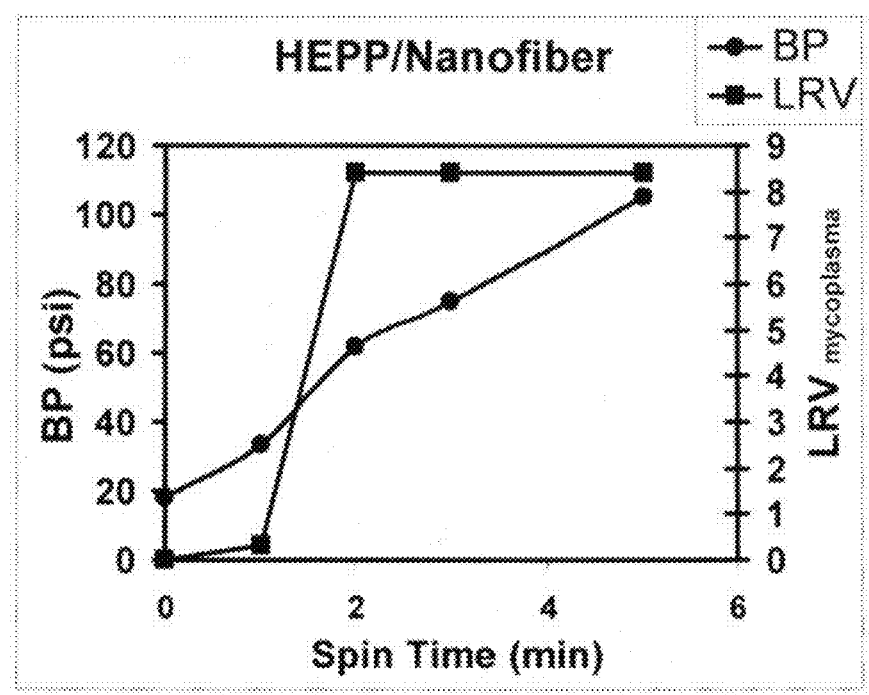
FIG. 5 demonstrates the correlation between spin time, bubble point, and mycoplasma retention of a composite liquid filtration platform according to an embodiment of this invention featuring a porous composite filtration structure having a polymeric nanofiber mat spun on a microporous asymmetric 0.45 µm rated membrane.

Investigation of spin time in manufacture of mycoplasma-retentive nanofiber/membrane composite. FIG. 5 depicts mycoplasma retention increase with the increase in the thickness of nanofiber layer. A composite sample for mycoplasma retention comprising a membrane with a 0.5 µm rating (prefilter layer of Millipore Express® SHC filter, EMD Millipore Corporation, Billerica, Mass.) and a nanofiber layer were proven to be fully retentive at spin times at and above 2 minutes.

Example 4

Manufacture of *B. diminuta*-retentive composite liquid filtration platform including a composite filtration medium featuring a nanofiber layer and a support membrane composite filtration medium.

Figure 6:
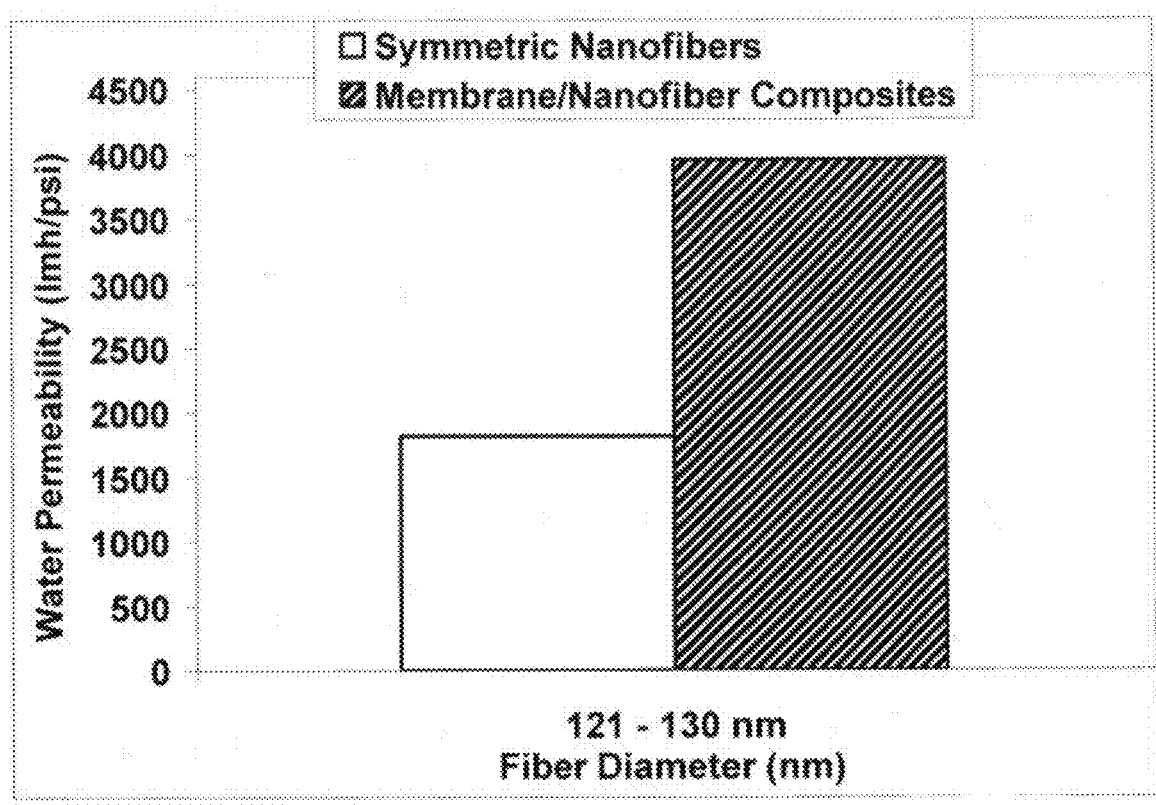
FIG. 6 depicts a comparison of water fluxes for nanofibers with similar *B. diminuta* retention (>9 LRV): a comparative example of a nanofiber mat spun on coarse non-woven and a composite liquid filtration platform according to an embodiment of this invention featuring a porous composite filtration structure having a polymeric nanofiber layer collected on a porous membrane.

The spinning solution was prepared by mixing 13% Nylon 6 (Ultramid® grade B 24 N 02) with a blend of acetic acid and formic acid (2:1 weight ratio) for 5 hours at 80° C. for the coarse non-woven supported case and by mixing 12% Nylon 6 (Ultramid® grade B27 E 01) in a blend of acetic acid and formic acid (2:1 weight ratio) for 5 hours at 80° C. for the composite filtration platform featuring a porous support membrane and a nanofiber layer. The solution was immediately spun using a 6-wire spinning electrode under 82 kV electric field. The coarse non-woven supported mat was spun in static mode for 30 minutes and the membrane/nanofiber composites were spun in dynamic mode where the substrate, a membrane with a 0.5 µm rating (prefilter layer of Millipore Express® SHC filter, EMD Millipore Corporation, Billerica, Mass.), moves over spinning electrodes at a constant speed. The nanofiber layer was peeled off the coarse non-woven substrate for testing. When the nanofiber was spun on a membrane, the membrane was kept together with the nanofiber in subsequent testing. Next, disk samples were cut and placed in 47 mm stainless steel holders for retention testing. FIG. 6 shows permeabilities of two samples of similar *B. diminuta* retention (>9 LRV): nanofiber mat spun on coarse non-woven and on membrane.

Example 5

Manufacture of a composite liquid filtration platform including a composite liquid filtration medium featuring a retrovirus-retentive nanofiber layer and a porous support membrane.

The spinning solution was prepared as a 12% Nylon 6 (Ultramid® grade B27 E 01) solution in a mixture of acetic acid, formic acid, and water (2:2:1 weight ratio) for 5 hours at 80° C. The solution was immediately spun using a 6-wire spinning electrode under 82 kV electric field. The symmetric mats were spun in static mode with a spin time of 30 minutes. The membrane/nanofiber composite samples were spun in dynamic mode where the substrate moves over spinning electrodes at a constant speed. Next, disc samples were cut and placed in overmolded devices for retention testing. The nanofiber layer was peeled off the non-woven substrate for testing. When the nanofiber was spun on a membrane, the membrane was kept together with the nanofiber in subsequent testing. Next, disk samples were cut and placed in overmolded devices described above for retention testing.

Figure 7:
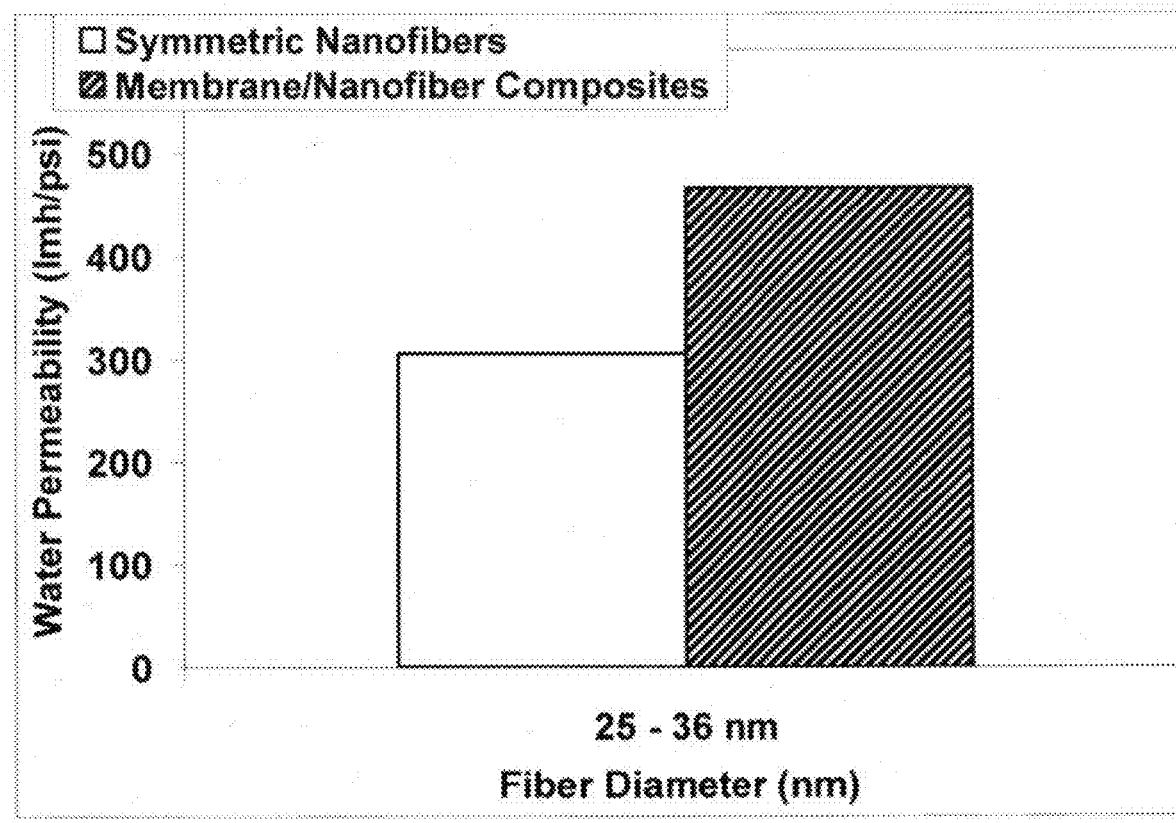
FIG. 7 depicts a comparison of water fluxes for nanofibers with similar retrovirus retention (>6 LRV): a comparative example of a nanofiber mat spun on coarse non-woven and a composite liquid filtration platform according to an embodiment of this invention featuring a porous composite filtration structure having a polymeric nanofiber layer collected on a porous membrane.

Both samples (non-woven supported mats and membrane/nanofiber composites) were tested for retention in a two layer format. The plotted values for membrane/nanofiber composites include the additional resistance of two layers of prefilter membrane. FIG. 7 shows permeabilities of two samples of similar Retrovirus retention (>6 LRV): nanofiber mat spud on a coarse non-woven and a nanofiber mat spun on a membrane. Table 1 demonstrates IPA bubble points for supporting membrane and the composites manufactured according to the examples.

TABLE 1

Bubble points measured for supporting 0.5 µm membrane and for membrane/nanofiber composites.

| | Mean Flow Bubble Point (psi) | | |
|---|---|---|---|
| | Membrane only | Composite | % increase |
| Example 2. *Mycoplasma* retention > 9 LRV | 17 | 111 | 653 |
| Example 4. Bacteria retention > 9 LRV | 17 | 26 | 153 |
| Example 5. Retrovirus retention > 6 LRV | 17 | 101 | 594 |

Example 6

Filtration throughput of a composite liquid filtration platform including a composite liquid filtration medium featuring a retrovirus-retentive nanofiber layer and a porous support membrane.

Figure 8:
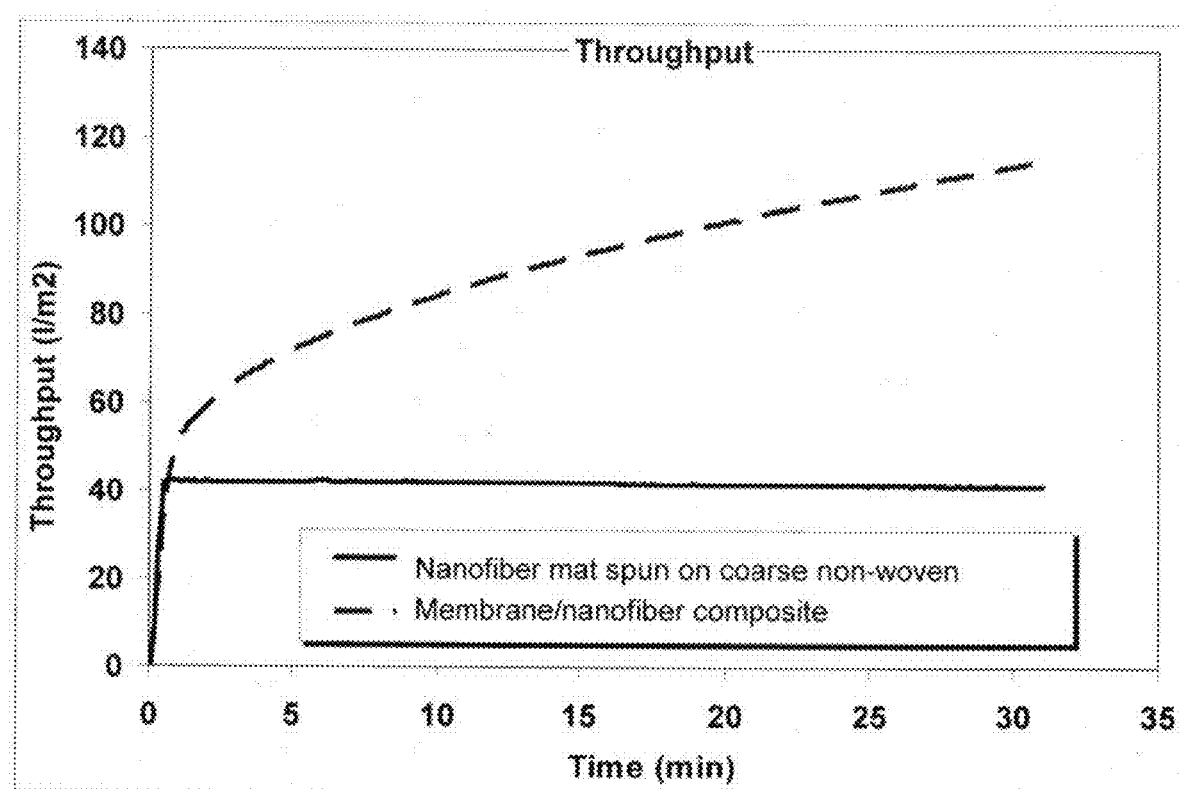
FIG. 8 depicts filtration capacity comparisons of a composite liquid filtration platform according to an embodiment of this invention featuring a porous composite filtration structure having a polymeric nanofiber layer collected on a porous membrane vs. a comparative example of a nanofiber mat spun on coarse non-woven of same nanofiber diameter and similar retention for mycoplasma (>9 LRV).

FIG. 8 depicts capacity comparisons of membrane/nanofiber composites vs. membranes spun on coarse non-woven of same nanofiber and similar retention for Mycoplasma. Throughput tests were done using a 2 g/L cell culture media stream that is customarily used to test mycoplasma-retentive membranes with prefilters. This media stream contains 2 g/L Peptone from Soymeal (Papaic) available from EMD Chemicals, a subsidiary of Merck KGgA, Darmstadt, Germany; 1 g/L of Pluronic F-68; 3.7 g/L sodium bicarbonate; and 10 g/L HyClone Powdered Tissue Culture Media DMEM/High available from Thermo Scientific Waltham, Mass. The porous membrane/nanofiber composite structure has a built in prefilter layer, a porous membrane with a 0.5 µm rating (prefilter layer of Millipore Express® SHC filter, EMD Millipore Corporation, Billerica, Mass.), which protects the nanofiber layer from early plugging, and thus enables the composite structure to exhibits higher filtration throughput.

Methods of Use

The composite liquid filtration platforms in accordance with the present invention are useful in the food, beverage, pharmaceuticals, biotechnology, microelectronics, chemical processing, water treatment, and other liquid treatment industries.

The composite liquid filtration platforms as taught herein are a highly effective composite for filtering, separating, identifying, and/or detecting microorganisms from a liquid sample or liquid stream, as well as removing viruses or particulates.

The composite liquid filtration platforms as taught herein are particularly useful in critical filtration of solutions and gases that may come into contact with or may contain pharmaceutical and biopharmaceutical compounds intended for human or animal administration.

The composite liquid filtration platforms as taught herein may be used with any liquid sample preparation methods including, but not limited to, chromatography; high pressure liquid chromatography (HPLC); electrophoresis; gel filtration; sample centrifugation; on-line sample preparation; diagnostic kits testing; diagnostic testing; high throughput screening; affinity binding assays; purification of a liquid sample; size-based separation of the components of the fluid sample; physical properties based separation of the components of the fluid sample; chemical properties based separation of the components of the fluid sample; biological properties based separation of the components of the fluid sample; electrostatic properties based separation of the components of the fluid sample; and, combinations thereof.

The composite liquid filtration platform as taught herein can be a component or part of a larger filtration device or system.

Kits

The composite filtration medium as taught herein can be provided as a kit, which may be used to remove microorganisms and particulates from a liquid sample or stream. The kit may comprise, for example, one or more composite filtration medium including an electrospun nanofiber liquid filtration layer on a porous membrane substrate as taught herein, as along with one or more liquid filtration devices or supports for incorporating and using the composite filtration medium.

The kit may contain one or more control solutions, and may optionally include various buffers useful in the methods of practicing the invention, such as wash buffers for eliminating reagents or eliminating non-specifically retained or bound material may optionally be included in the kit.

Other optional kit reagents include an elution buffer. Each of the buffers may be provided in a separate container as a solution. Alternatively the buffers may be provided in dry form or as a powder and may be made up as a solution according to the user's desired application. In this case the buffers may be provided in packets.

The kit may provide a power source in instances where the device is automated as well as a means of providing an external force such as a vacuum pump. The kit may also include instructions for using the electrospun nanofiber containing liquid filtration medium, device, support or substrate, and/or for making up reagents suitable for use with the invention, and methods of practicing invention. Optional software for recording and analyzing data obtained while practicing the methods of the invention or while using the device of the invention may also be included.

The term "kit" includes, for example, each of the components combined in a single package, the components individually packaged and sold together, or the components presented together in a catalog (e.g., on the same page or double-page spread in the catalog).

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A porous composite media comprising:
a porous asymmetric polyethersulfone (PES) flat sheet membrane prefilter having a tight side and an open side and a pore size increasing in size between the tight side and the open side, and a porous polyamide electrospun nanofiber mat retentive layer consisting essentially of Nylon 6 located on the tight side of the porous asymmetric PES flat sheet membrane wherein the porous polyamide electrospun nanofiber mat retentive layer has an average fiber diameter of about 25 nm to about 130 nm and an effective pore size of from about 50 nm to about 500 nm based on the bubble point of the polymeric electrospun nanofiber retentive layer,
wherein the pore size of the porous polyamide electrospun nanofiber mat retentive layer consisting essentially of Nylon 6 is smaller than the pore size of the tight side of the porous asymmetric PES flat sheet membrane prefilter.

2. The porous composite media of claim 1, having a bubble point, as measured with a liquid, which is at least 20% greater than the bubble point of the porous flat sheet membrane prefilter alone.

3. The porous composite media of claim 1, having a total thickness from about 10 µm to about 500 µm.

4. The porous composite media of claim 1, having a total thickness from about 50 µm to about 200 µm.

5. The porous composite media of claim 1, wherein the porous polyamide electrospun nanofiber mat retentive layer has a thickness from about 1 µm to about 200 µm.

6. The porous composite media of claim 1, wherein the porous polyamide electrospun nanofiber mat retentive layer has a thickness from about 1 µm to about 100 µm.

7. The porous composite media of claim 1, wherein the porous polyamide electrospun nanofiber mat retentive layer has a thickness from about 1 µm to about 25 µm.

8. The porous composite media of claim 1, wherein the porous asymmetric PES flat sheet membrane has a thickness from about 10 µm to about 500 µm.

9. The porous composite media of claim 1, wherein the porous asymmetric PES flat sheet membrane has a thickness from about 50 µm to about 200 µm.

10. The porous composite media of claim 1, wherein the porous asymmetric PES flat sheet membrane comprises one or more layers produced by solution phase inversion.

11. The porous composite media of claim 1, having a mean flow bubble point for isopropanol ranging from about 10 psi to about 130 psi.

12. The porous composite media according to claim 1, wherein the retentive filter layer comprises a porosity ranging from 80% to 95%.

13. The porous composite media according to claim 1, wherein the porous polyamide electrospun nanofiber mat retentive layer consisting essentially of Nylon 6 is produced from a spinning solution of about 12-14% Nylon 6 in acetic acid and formic acid at a 2:1 weight ratio or about 12-14% Nylon 6 in acetic acid, formic acid and water at a weight ratio of 2:2:1.

14. The porous composite media of claim 1, wherein the porous asymmetric polyethersulfone (PES) flat sheet membrane prefilter has a first surface on the tight side and a second surface on the open side and wherein the first surface on the tight side is smooth.

15. A filtration device for use in critical filtration comprising a composite media comprising:
a prefilter layer having a porous asymmetric polyethersulfone (PES) flat sheet membrane having a tight side, an open side and a pore size increasing in size between the tight side and the open side, and a retentive filter layer having a porous polyamide electrospun nanofiber mat consisting essentially of Nylon 6 located on the tight side of the porous asymmetric PES flat sheet membrane wherein the polyamide electrospun nanofiber mat has an effective pore size of from about 50 nm to about 500 nm based on the bubble point of the polyamide electrospun nanofiber mat and has an average fiber diameter of about 25 nm to about 130 nm,
wherein the pore size on the tight side of the porous asymmetric PES flat sheet membrane is larger than pore size of the porous polyamide electrospun nanofiber mat consisting essentially of Nylon 6.

16. The filtration device of claim 15,
wherein said composite filtration media is positioned in said device such that said porous asymmetric PES flat sheet membrane is upstream, in the direction of filtration, of said porous polyamide electrospun nanofiber mat, whereby said porous asymmetric PES flat sheet membrane provides prefiltration of said sample and said porous polymeric electrospun nanofiber mat provides further filtration of said sample.

17. The filtration device of claim 16, wherein said composite filtration media has a bubble point as measured with a liquid, of at least 20% greater than the bubble point of the porous asymmetric PES flat sheet membrane alone.

18. The filtration device of claim 16, wherein said composite filtration media has a total thickness from about 10 μm to about 500 μm.

19. The filtration device of claim 16, wherein said composite filtration media has a total thickness from about 50 μm to about 200 μm.

20. The filtration device of claim 16, wherein the retentive filter layer has a thickness from about 1 μm to about 200 μm.

21. The filtration device of claim 16, wherein the retentive filter layer has a thickness from about 1 μm to about 100 μm.

22. The filtration device of claim 16, wherein the retentive filter layer has a thickness from about 1 μm to about 25 μm.

23. The filtration device of claim 16, wherein the porous PES flat sheet membrane has a thickness from about 10 μm to about 500 μm.

24. The filtration device of claim 16, wherein the porous PES flat sheet membrane has a thickness from about 50 μm to about 200 μm.

25. The filtration device of claim 16, wherein the porous PES flat sheet membrane is produced by solution phase inversion.

26. The filtration device of claim 16, wherein said composite media has a mean flow bubble point for isopropanol from about 10 psi to about 130 psi.

27. The porous composite media according to claim 15, wherein the porous polyamide electrospun nanofiber mat retentive layer consisting essentially of Nylon 6 is produced from a spinning solution of about 12-14% Nylon 6 in acetic acid and formic acid at a 2:1 weight ratio or about 12-14% Nylon 6 in acetic acid, formic acid and water at a weight ratio of 2:2:1.

* * * * *